United States Patent
Hosoi et al.

(10) Patent No.: US 9,835,063 B2
(45) Date of Patent: Dec. 5, 2017

(54) HONEYCOMB STRUCTURE

(71) Applicant: NGK Insulators, Ltd., Nagoya (JP)

(72) Inventors: Yusuke Hosoi, Koganei (JP); Tsuyoshi Watanabe, Nagoya (JP); Takayuki Inoue, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 426 days.

(21) Appl. No.: 14/627,134

(22) Filed: Feb. 20, 2015

(65) Prior Publication Data
US 2015/0260066 A1    Sep. 17, 2015

(30) Foreign Application Priority Data

Mar. 13, 2014   (JP) .................................. 2014-050842

(51) Int. Cl.
*B01D 50/00*    (2006.01)
*F01N 3/022*   (2006.01)
(Continued)

(52) U.S. Cl.
CPC ....... *F01N 3/0222* (2013.01); *B01D 46/2418* (2013.01); *B01D 46/2429* (2013.01);
(Continued)

(58) Field of Classification Search
CPC .. F01N 3/027; F01N 2240/16; B01D 46/0057
See application file for complete search history.

(56) References Cited

U.S. PATENT DOCUMENTS 5,063,029 A    11/1991    Mizuno et al.
5,288,975 A     2/1994    Kondo
(Continued)

FOREIGN PATENT DOCUMENTS

EP    2 784 051 A2    10/2014
JP    05-144549 A1     6/1993
(Continued)

OTHER PUBLICATIONS

Extended European Search Report (Application No. 15157949.7) dated Jul. 17, 2015.
(Continued)

*Primary Examiner* — Amber R Orlando
(74) *Attorney, Agent, or Firm* — Burr & Brown, PLLC

(57) ABSTRACT

The honeycomb structure includes a honeycomb structure body and a pair of electrode members disposed on a side surface of the honeycomb structure body, each of the pair of electrode members is shaped in the form of a band extending in a cell extending direction, and in a cross section perpendicular to the extending direction of cells, one electrode member is disposed on a side opposite to the other electrode member via a center of the honeycomb structure body, one or more slits opened in the side surface are formed in the honeycomb structure body, the honeycomb structure body has a charging material charged into the at least one slit, the charging material contains aggregates and a neck material, and a ratio ($\alpha 2/\alpha 1$) of a thermal expansion coefficient $\alpha 2$ of the charging material to a thermal expansion coefficient $\alpha 1$ of the honeycomb structure body is from 0.6 to 1.5.

15 Claims, 7 Drawing Sheets

(51) Int. Cl.

| | | |
|---|---|---|
| *B01D 46/24* | (2006.01) | |
| *B01J 35/04* | (2006.01) | |
| *C04B 38/00* | (2006.01) | |
| *F01N 3/20* | (2006.01) | |
| *F01N 3/28* | (2006.01) | |
| *C04B 35/195* | (2006.01) | |
| *C04B 111/32* | (2006.01) | |

(52) U.S. Cl.
CPC ............ *B01J 35/04* (2013.01); *C04B 35/195* (2013.01); *C04B 38/0006* (2013.01); *F01N 3/2026* (2013.01); *F01N 3/2828* (2013.01); *C04B 2111/32* (2013.01); *C04B 2235/3418* (2013.01); *C04B 2235/3826* (2013.01); *C04B 2235/428* (2013.01); *C04B 2235/5427* (2013.01); *C04B 2235/5436* (2013.01); *C04B 2235/6021* (2013.01); *F01N 2260/10* (2013.01); *F01N 2330/06* (2013.01); *F01N 2330/14* (2013.01); *F01N 2330/30* (2013.01); *Y02T 10/26* (2013.01)

(56) References Cited

U.S. PATENT DOCUMENTS

| | | | |
|---|---|---|---|
| 5,463,206 A | 10/1995 | Abe et al. | |
| RE35,134 E | 12/1995 | Mizuno et al. | |
| 7,247,184 B2 | 7/2007 | Frost | |
| 7,601,194 B2 | 10/2009 | Beall et al. | |
| 9,139,479 B2 | 9/2015 | Chapman et al. | |
| 2003/0134084 A1 | 7/2003 | Ichikawa et al. | |
| 2005/0066639 A1 | 3/2005 | Frost | |
| 2005/0166562 A1 | 8/2005 | Beall et al. | |
| 2010/0009024 A1 | 1/2010 | Beall et al. | |
| 2012/0076699 A1* | 3/2012 | Ishihara | B01J 19/2485 422/174 |
| 2013/0043236 A1 | 2/2013 | Sakashita et al. | |
| 2013/0224430 A1 | 8/2013 | Chapman et al. | |
| 2014/0291315 A1 | 10/2014 | Mase et al. | |
| 2015/0030510 A1 | 1/2015 | Mase et al. | |
| 2015/0344375 A1 | 12/2015 | Chapman et al. | |
| 2017/0044066 A1 | 2/2017 | Bubb et al. | |

FOREIGN PATENT DOCUMENTS

| | | |
|---|---|---|
| JP | 2931362 B2 | 8/1999 |
| JP | 2007-519505 A1 | 7/2007 |
| JP | 4136319 B2 | 8/2008 |
| WO | 2011/125815 A1 | 10/2011 |
| WO | 2013/126634 A1 | 8/2013 |
| WO | 2013/146955 A1 | 10/2013 |

OTHER PUBLICATIONS

Japanese Office Action (Application No. 2014-050842) dated Jun. 20, 2017 (with English translation).

* cited by examiner

HONEYCOMB STRUCTURE

The present application is an application based on JP 2014-050842 filed on Mar. 13, 2014 with Japan Patent Office, the entire contents of which are incorporated herein by reference.

BACKGROUND OF THE INVENTION

Field of the Invention

The present invention relates to a honeycomb structure, and more particularly, it relates to a honeycomb structure which is a catalyst carrier and also functions as a heater when a voltage is applied thereto, and which can inhibit an unevenness of a temperature distribution when the voltage is applied thereto and can improve a thermal shock resistance.

Background Art

Heretofore, a honeycomb structure which is made of cordierite and onto which a catalyst is loaded has been used in treatment of harmful substances in an exhaust gas discharged from a car engine. Furthermore, it is also known that a honeycomb structure formed by a silicon carbide sintered body is for use in purification of the exhaust gas (e.g., see Patent Document 1).

When the exhaust gas is treated by the catalyst loaded onto the honeycomb structure, it is necessary to raise a temperature of the catalyst up to a predetermined temperature. However, at the start of the engine, the temperature of the catalyst is low, and hence there has been the problem that the exhaust gas is not sufficiently purified.

To solve the problem, there has been investigated a method of disposing a heater made of a metal on an upstream side of a honeycomb structure onto which a catalyst is loaded, to raise a temperature of an exhaust gas (e.g., see Patent Document 2). In addition, there has been investigated a method in which a catalyst is loaded and used onto a heater made of a metal (e.g., see Patent Document 3).

Furthermore, it has been suggested that a honeycomb structure made of a ceramic material is used as "a heatable catalyst carrier" (e.g., see Patent Documents 4 and 5).

CITATION LIST

Patent Documents

[Patent Document 1] JP-B2-4136319
[Patent Document 2] JP-B2-2931362
[Patent Document 3] JP-A-H05-144549
[Patent Document 4] WO 2011/125815
[Patent Document 5] WO 2013/146955

SUMMARY OF THE INVENTION

When such a heater as described above is mounted and used in a car, a power source for use in an electric system of the car is used in common and, for example, a power source having a high voltage of 200 V is used. However, in the heater made of the metal, an electric resistance is low, which has caused the problem that a current excessively flows through the heater and damages a power source circuit sometimes when such a power source of the high voltage is used.

Furthermore, in Patent Documents 2 and 3, a slit which is a resistance adjusting mechanism is disposed in a heater to prevent a current from excessively flowing through the heater, and heat is suitably generated by energization. This slit is formed so that the current does not flow along the short distance (linearly) between a pair of electrodes.

In addition, a honeycomb structure described in Patent Document 4 is made of a ceramic material having a predetermined electrical resistivity, and hence the honeycomb structure suitably heats by energization without any damages or the like on an electric circuit. The honeycomb structure described in Patent Document 4 is excellent as an energization heat generation type of catalyst carrier, but a further improvement has been demanded in terms of a thermal shock resistance.

Additionally, in a honeycomb structure described in Patent Document 5, one or more slits opened in a side surface are formed in a honeycomb structure body. Further, in the honeycomb structure described in Patent Document 5, a technology in which a charging material is charged into the abovementioned slits is disclosed. However, in the honeycomb structure including the charging material charged into the slits, for example, such three problems as described in the following are generated in the honeycomb structure body or the charging material sometimes, and a further improvement has been required for a constitution of the charging material. The first problem is that, for example, when the charging material excessively thermally expands, a shearing stress is generated in a boundary between the honeycomb structure body and the charging material and the charging material is damaged sometimes. The second problem is that, for example, when a strength of the charging material is low, the charging material is easily broken and the slits are noticeably deformed to generate cracks and the like from the vicinities of the slits to end faces of the honeycomb structure body sometimes. The third problem is that, for example, when Young's modulus of the charging material is excessively high, a stress relaxing ability by the slits deteriorates and cracks and the like are generated in, for example, the end faces of the honeycomb structure body sometimes.

The present invention has been developed in view of the abovementioned problems. According to the present invention, there is provided a honeycomb structure which is a catalyst carrier and also functions as a heater when a voltage is applied thereto, and which can inhibit an unevenness of a temperature distribution when the voltage is applied thereto and can improve a thermal shock resistance.

To solve the abovementioned problems, according to the present invention, there is provided a honeycomb structure described in the following.

[1] A honeycomb structure including a pillar honeycomb structure body having porous partition walls defining a plurality of cells which become through channels for a fluid and extend from a first end face to a second end face, and a circumferential wall positioned at an outermost circumference; and a pair of electrode members disposed on a side surface of the honeycomb structure body, wherein the honeycomb structure body heats by energization, each of the pair of electrode members is shaped in the form of a band extending in an extending direction of the cells of the honeycomb structure body, and in a cross section perpendicular to the extending direction of the cells, one electrode member in the pair of electrode members is disposed on a side opposite to the other electrode member in the pair of electrode members via a center of the honeycomb structure body, one or more slits opened in the side surface are formed in the honeycomb structure body, the honeycomb structure body has a charging material charged into the at least one slit, the charging material is disposed in at least a part of a space of the slit, the charging material contains aggregates and a neck material, and a ratio ($\alpha 2/\alpha 1$) of a thermal expansion coefficient α2 of the charging material at 25 to 800° C. to a thermal expansion coefficient α1 of the honeycomb structure body at 25 to 800° C. is from 0.6 to 1.5.

[2] The honeycomb structure according to the above [1], wherein a strength of the charging material is 500 kPa or more and Young's modulus of the charging material is 1500 MPa or less.

[3] The honeycomb structure according to the above [1] or [2], wherein a porosity of the charging material is from 20 to 90%.

[4] The honeycomb structure according to any one of the above [1] to [3], wherein the charging material contains 2 to 90 mass % of the neck material.

[5] The honeycomb structure according to any one of the above [1] to [4], wherein the charging material contains the aggregates including silicon carbide and a content of the aggregates including silicon carbide in the charging material is 90 mass % or less.

[6] The honeycomb structure according to the above [5], wherein an average particle diameter of the aggregates including silicon carbide is 300 μm or less.

[7] The honeycomb structure according to any one of the above [1] to [6], wherein the charging material contains the aggregates including cordierite.

[8] The honeycomb structure according to the above [7], wherein an average particle diameter of the aggregates including cordierite is 300 μm or less.

[9] The honeycomb structure according to any one of the above [1] to [8], wherein the charging material contains the aggregates including silicon oxide and a content of the aggregates including silicon oxide in the charging material is 80 mass % or less.

[10] The honeycomb structure according to the above [9], wherein an average particle diameter of the aggregates including silicon oxide is 300 μm or less.

[11] The honeycomb structure according to any one of the above [1] to [10], wherein an electrical resistivity of the honeycomb structure body is from 1 to 200 Ωcm.

In a honeycomb structure of the present invention, one or more slits opened in a side surface are formed in a honeycomb structure body. Furthermore, in the slits formed in the honeycomb structure body, a charging material containing a plurality of aggregate particles and a neck material entering into spaces among the aggregate particles to bond the aggregate particles to one another is disposed. Additionally, in the honeycomb structure of the present invention, a ratio (α2/α1) of a thermal expansion coefficient α2 of the charging material to a thermal expansion coefficient α1 of the honeycomb structure body is from 0.6 to 1.5. Therefore, the honeycomb structure of the present invention is a catalyst carrier and also functions as a heater when a voltage is applied thereto, and can inhibit an unevenness of a temperature distribution when the voltage is applied thereto and can improve a thermal shock resistance.

DESCRIPTION OF THE PREFERRED EMBODIMENTS

Next, a mode for carrying out the present invention will be described in detail with reference to the drawings. It should be understood that the present invention is not limited to the following embodiments and that a change, an improvement or the like of design is suitably added on the basis of ordinary knowledge of a person skilled in the art without departing from the gist of the present invention.

Figure 1:
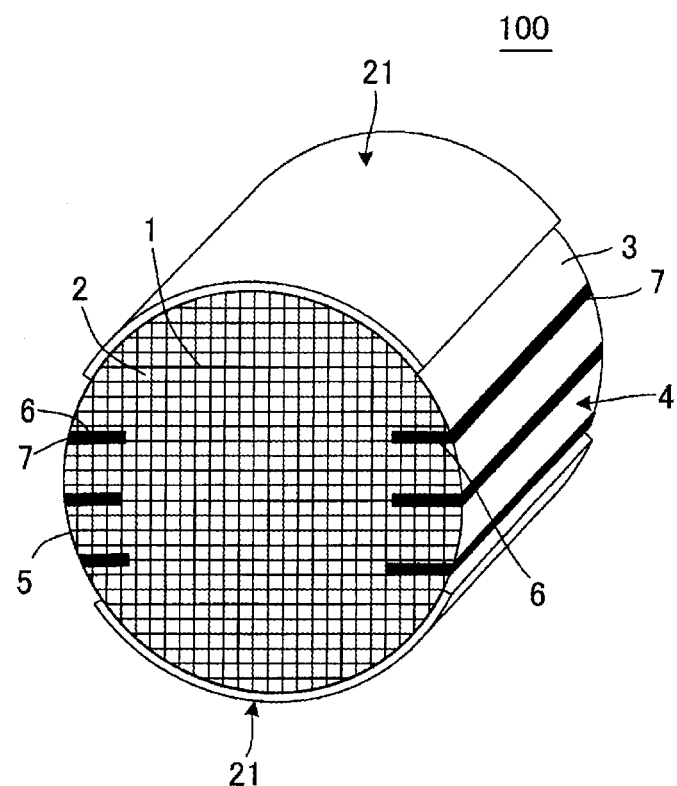
FIG. 1 is a perspective view schematically showing one embodiment of a honeycomb structure of the present invention.
Figure 2:
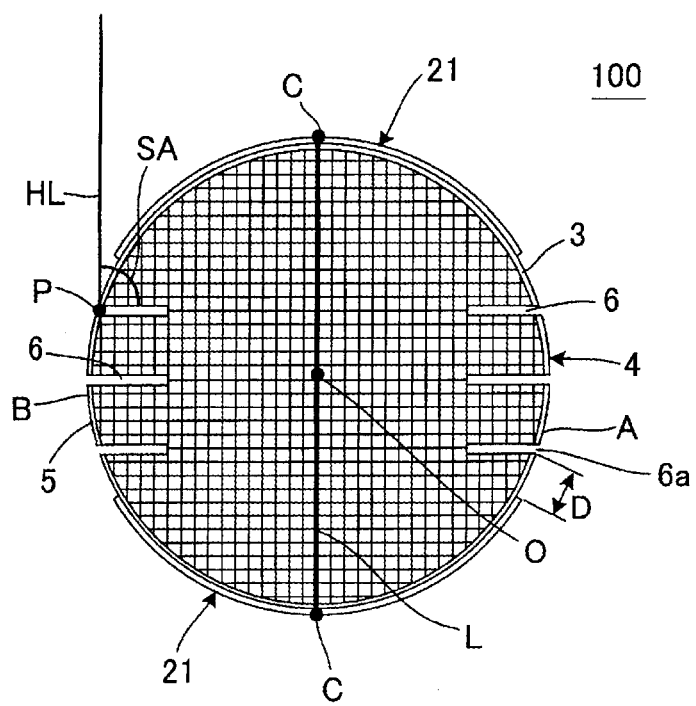
FIG. 2 is a schematic view showing a cross section perpendicular to a cell extending direction of the one embodiment of the honeycomb structure of the present invention.
Figure 3:
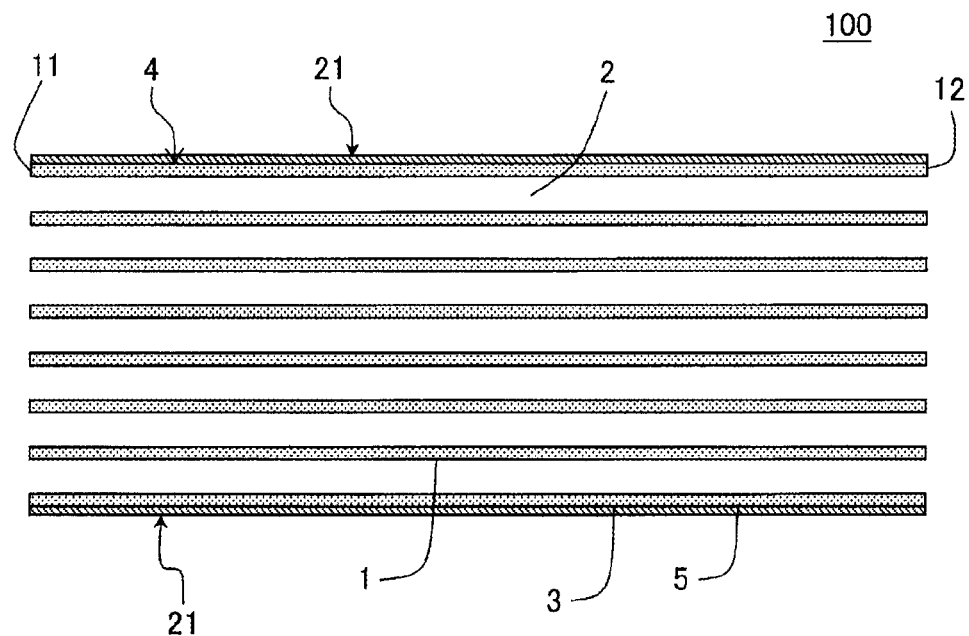
FIG. 3 is a schematic view showing a cross section parallel to the cell extending direction of the one embodiment of the honeycomb structure of the present invention.

(1) Honeycomb Structure:

As shown in FIG. 1 to FIG. 3, one embodiment of a honeycomb structure of the present invention includes a pillar honeycomb structure body 4 and a pair of electrode members 21. The pillar honeycomb structure body 4 has porous partition walls 1 defining a plurality of cells 2 extending from a first end face 11 which is one end face to a second end face 12 which is the other end face, and a circumferential wall 3 positioned at an outermost circumference. The plurality of cells 2 become through channels for a fluid. Hereinafter, the first end face 11 and the second end face 12 of the honeycomb structure body 4 will generically be referred to simply as "the end faces of the honeycomb structure body 4". The pair of electrode members 21 is disposed on a side surface 5 of the honeycomb structure body 4. The honeycomb structure body 4 of a honeycomb structure 100 of the present embodiment is made of a material having a conductivity and heats by energization. That is, the honeycomb structure body 4 heats by Joule heat when a current is allowed to pass therethrough. In the honeycomb structure 100 of the present embodiment, each of the pair of electrode members 21, 21 is shaped in the form of a band extending in an extending direction of the cells 2 of the honeycomb structure body 4. In the honeycomb structure 100 of the present embodiment, in a cross section perpendicular to the extending direction of the cells 2, one electrode member 21 is disposed on a side opposite to the other electrode member 21 via a center O of the honeycomb structure body 4. The one electrode member 21 is one electrode member 21 in the pair of electrode members 21, 21 (of the pair of electrode members 21, 21), and the other electrode member 21 is the other electrode member 21 in the pair of electrode members 21, 21 (of the pair of electrode members 21, 21). In other words, the one electrode member 21 of the pair of electrode members 21, 21 is the one electrode member 21, and the residual one electrode member 21 of the pair of electrode members 21, 21 is the other electrode member 21.

In the honeycomb structure 100 of the present embodiment, one or more slits 6 opened in the side surface 5 are formed in the honeycomb structure body 4. Furthermore, the honeycomb structure body 4 has a charging material 7 charged into the at least one slit 6. That is, in the honeycomb structure 100 of the present embodiment, the charging material 7 is disposed to close at least a part of a space of each of the slits 6. In the honeycomb structure 100 of the present embodiment, the charging material 7 contains aggregates and a neck material. That is, the charging material 7 contains a plurality of aggregate particles, and the neck material entering into spaces among the plurality of aggregate particles to bond the aggregate particles to one another. In the honeycomb structure 100 of the present embodiment, a ratio ($\alpha 2/\alpha 1$) of a thermal expansion coefficient $\alpha 2$ of the charging material 7 at 25 to 800° C. to a thermal expansion coefficient $\alpha 1$ of the honeycomb structure body 4 at 25 to 800° C. is from 0.6 to 1.5. Hereinafter, in the present description, the thermal expansion coefficient means the thermal expansion coefficient at 25 to 800° C., unless otherwise specifically noted. "The neck material" enters into the spaces among the aggregate particles to bond and fix the particles to one another.

The thermal expansion coefficients of the honeycomb structure body and the charging material can be measured by the following method. First, a measurement sample (the sample for the honeycomb structure body) of a vertical size of 1 mm×a horizontal size of 3 mm×a length of 50 mm is prepared from the honeycomb structure body of the honeycomb structure. Furthermore, a measurement sample (the sample for the charging material) of a vertical size of 1 mm×a horizontal size of 3 mm×a length of 50 mm is prepared from the charging material charged into the slits of the honeycomb structure. Hereinafter, a direction from one end toward the other end of a portion having the length of 50 mm in each of the measurement samples will be referred to as "a length direction of the measurement sample" sometimes. The respective measurement samples are cut out and prepared from the honeycomb structure so that the cell extending direction of the honeycomb structure becomes the length direction of the measurement sample. Specifically, a direction (the length direction) in which the length of the measurement sample is 50 mm corresponds to the cell extending direction of the honeycomb structure. A direction (a horizontal direction) in which the horizontal size of the measurement sample is 3 mm corresponds to a circumferential direction of the side surface of the honeycomb structure. A direction (a vertical direction) in which the vertical size of the measurement sample is 1 mm corresponds to a direction from the side surface of the honeycomb structure toward the inside. The length of each measurement sample in the vertical direction may be a length of one cell formed in the honeycomb structure. The length of each measurement sample in the horizontal direction may be a total length of three cells formed in the honeycomb structure. When it is difficult to prepare the measurement sample having the abovementioned size, a measuring test piece made of the same material and having the same configuration as in the honeycomb structure of a measurement object may separately be prepared, and each measurement sample may be cut out and prepared from the prepared measuring test piece. The measuring test piece has a size larger than that required for each measurement sample. In addition, when the length of the honeycomb structure in the cell extending direction is so short that the measurement sample cannot acquire the length of 50 mm, a sample prepared from a material in which thermal expansion characteristics are beforehand known may complimentarily be applied in the cell extending direction of the honeycomb structure to measure the thermal expansion coefficient. For example, when the length of the honeycomb structure in the cell extending direction is 25 mm, a sample insufficiently having a length of 25 mm (in which the thermal expansion characteristics are known) is preferably applied to the honeycomb structure to measure the thermal expansion coefficient. As to each of the prepared sample for the honeycomb structure body and the prepared sample for the charging material, a linear thermal expansion coefficient at 25 to 800° C. is measured by a method in conformity with JIS R 1618. The linear thermal expansion coefficient at 25 to 800° C. is measured in the length direction of each measurement sample. As a thermal expansion meter, "TD5000S (trade name)" manufactured by Bruker AXS GmbH is usable. The thermal expansion coefficient of the sample for the honeycomb structure body which is measured by the above method is "the thermal expansion coefficient $\alpha 1$ of the honeycomb structure body at 25 to 800° C.". The thermal expansion coefficient of the sample for the charging material which is measured by the above method is "the thermal expansion coefficient $\alpha 2$ of the charging material at 25 to 800° C.".

Here, FIG. 1 is a perspective view schematically showing this one embodiment of the honeycomb structure of the present invention. FIG. 2 is a schematic view showing a cross section perpendicular to the cell extending direction of the one embodiment of the honeycomb structure of the present invention. FIG. 3 is a schematic view showing the cross section parallel to the cell extending direction of the one embodiment of the honeycomb structure of the present invention.

The side surface 5 of the honeycomb structure body 4 is the surface of the circumferential wall 3 of the honeycomb structure body 4. Furthermore, "the slits 6 opened in the side surface 5 (of the honeycomb structure body 4)" are the slits opened in the surface of the circumferential wall 3 of the honeycomb structure body 4. Furthermore, when "the slits are opened in an outer circumference of the honeycomb structure body", it is meant that long cuts are formed by open ends of the slits in one direction in the surface of the circumferential wall. The slits may be opened in the side surface and may be opened in the first end face and the second end face.

As described above, in the honeycomb structure 100 of the present embodiment, the honeycomb structure body 4 heats by the Joule heat, and hence the honeycomb structure is suitably usable as a heater. Furthermore, in the honeycomb structure 100, each of the pair of electrode members 21, 21 is shaped in the form of a band extending in the extending direction of the cells 2 of the honeycomb structure body 4. Additionally, in the honeycomb structure 100, in the cross section perpendicular to the extending direction of the cells 2, the one electrode member 21 in the pair of electrode members 21, 21 is disposed on the side opposite to the other electrode member 21 in the pair of electrode members 21, 21 via the center 0 of the honeycomb structure body 4. Therefore, the honeycomb structure 100 can inhibit an unevenness of a temperature distribution when a voltage is applied thereto.

Figure 4:
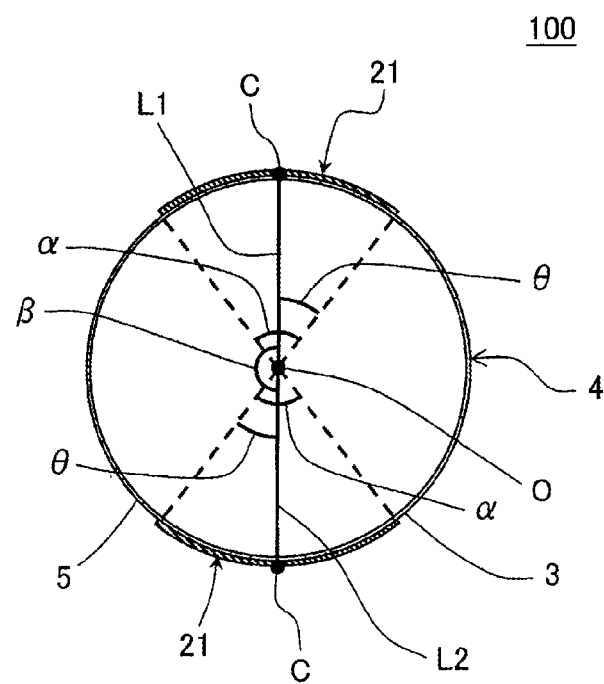
FIG. 4 is a schematic view showing the cross section perpendicular to the cell extending direction of the one embodiment of the honeycomb structure of the present invention.

Here, when "in the cross section perpendicular to the extending direction of the cells 2, the one electrode member 21 in the pair of electrode members 21, 21 is disposed on the side opposite to the other electrode member 21 in the pair of electrode members 21, 21 via the center O of the honeycomb structure body 4", the following is meant. That is, as shown in FIG. 4, first, in the cross section perpendicular to the extending direction of the cells 2, "a line segment connecting a central portion C of the one electrode member 21 (a point of a center in 'a circumferential direction of the honeycomb structure body 4') to the center O of the honeycomb structure body 4" is a line segment L1. Furthermore, in the cross section perpendicular to the extending direction of the cells 2, "a line segment connecting a central portion C of the other electrode member 21 (the point of the center in 'the circumferential direction of the honeycomb structure body 4') to the center O of the honeycomb structure body 4" is a line segment L2. At this time, it is meant that the pair of electrode members 21, 21 are disposed on the honeycomb structure body 4 to obtain a positional relation in which an angle β formed by the line segment L1 and the line segment L2 (an angle around "the center O") is in a range of 170° to 190°. FIG. 4 is a schematic view showing the cross section perpendicular to the cell extending direction of the one embodiment of the honeycomb structure of the present invention. In FIG. 4, the partition walls and the slits are omitted.

As shown in FIG. 1 to FIG. 3, in the honeycomb structure 100 of the present embodiment, the one or more slits 6 opened in the side surface 5 are formed in the honeycomb structure body 4. Furthermore, the charging material 7 containing the aggregates and the neck material is disposed in the slits 6. In the honeycomb structure 100 of the present embodiment, the ratio ($\alpha 2/\alpha 1$) of the thermal expansion coefficient $\alpha 2$ of the charging material 7 to the thermal expansion coefficient $\alpha 1$ of the honeycomb structure body 4 is from 0.6 to 1.5. Therefore, it is possible to effectively prevent the honeycomb structure body 4 and the charging material 7 from being damaged by the constitution in which the charging material 7 is disposed in the slits 6. For example, when the ratio ($\alpha 2/\alpha 1$) of the thermal expansion coefficient $\alpha 2$ of the charging material 7 to the thermal expansion coefficient $\alpha 1$ of the honeycomb structure body 4 is smaller than 0.6, vertical cracks are generated in the honeycomb structure body 4 sometimes due to insufficient expansion of the charging material. When the ratio ($\alpha 2/\alpha 1$) of the thermal expansion coefficient $\alpha 2$ of the charging material 7 to the thermal expansion coefficient $\alpha 1$ of the honeycomb structure body 4 is in excess of 1.5, the cracks are generated in the end faces of the honeycomb structure body 4 sometimes due to excessive expansion of the charging material. Hereinafter, "the ratio ($\alpha 2/\alpha 1$) of the thermal expansion coefficient $\alpha 2$ of the charging material 7 to the thermal expansion coefficient $\alpha 1$ of the honeycomb structure body 4" will be referred to as "the thermal expansion coefficient ratio ($\alpha 2/\alpha 1$)" sometimes.

In the honeycomb structure 100 of the present embodiment, the thermal expansion coefficient ratio ($\alpha 2/\alpha 1$) is preferably from 0.8 to 1.25. According to such a constitution, the thermal expansion coefficient $\alpha 1$ of the honeycomb structure body 4 is close to the thermal expansion coefficient $\alpha 2$ of the charging material 7, and hence the generation of various cracks due to a heat stress can effectively be inhibited.

The charging material 7 contains the aggregates and the neck material. There is not any special restriction on a material of the neck material. For example, the neck material preferably includes at least one selected from the group consisting of silicon oxide, a metal oxide, a metal and a metal compound. There are such examples of a configuration of the neck material as described in the following. The neck material may include at least one of silicon oxide and the metal oxide, or the neck material may be constituted of at least one of silicon oxide and the metal oxide. Heretofore, a material of the aggregates and the neck material have been selected so that the charging material becomes conductive, in a case where the charging material is charged into the slits formed in the honeycomb structure body of the honeycomb structure which also functions as the heater when the voltage is applied thereto. For example, in the conventional honeycomb structure, the charging material has been made conductive by using a conductive material such as silicon carbide or metal silicon as the neck material, when the charging material is charged into the slits. In the honeycomb structure 100 of the present embodiment, it is not necessarily required to impart a conductivity to the charging material 7, and hence as the neck material, a non-conductive material or a material having a low conductivity, e.g., silicon oxide or metal oxide is usable. As described above, in the honeycomb structure of the present embodiment, silicon oxide, which has hardly been used as the material of the neck material in the conventional honeycomb structure, can positively be used as the neck material, which raises a degree of freedom concerning the material selection of the neck material.

A strength of the charging material 7 is preferably 500 kPa or more, further preferably 650 kPa or more, and especially preferably 800 kPa or more. When the strength of the charging material 7 is smaller than 500 kPa, the charging material 7 is easily broken, and hence the cracks are easily generated in the end faces of the honeycomb structure body 4. There is not any special restriction on an upper limit value of the strength of the charging material 7, but the upper limit value is, for example, about 4000 kPa.

Young's modulus of the charging material 7 is preferably 1500 MPa or less, further preferably 1300 MPa or less, and especially preferably 1000 MPa or less. When the Young's modulus of the charging material 7 is in excess of 1500 MPa, a stress relaxing function deteriorates to easily generate vertical cracks in the honeycomb structure body 4 sometimes. There is not any special restriction on a lower limit value of the Young's modulus of the charging material 7, but the lower limit value is, for example, about 10 MPa.

In the honeycomb structure 100 of the present embodiment, the strength of the charging material 7 is preferably 500 kPa or more and the Young's modulus of the charging material 7 is preferably 1500 MPa or less. According to such a constitution, it is possible to effectively inhibit the generation of various cracks that are generatable in the honeycomb structure body 4 while effectively acquiring the stress relaxing function.

Figure 14:
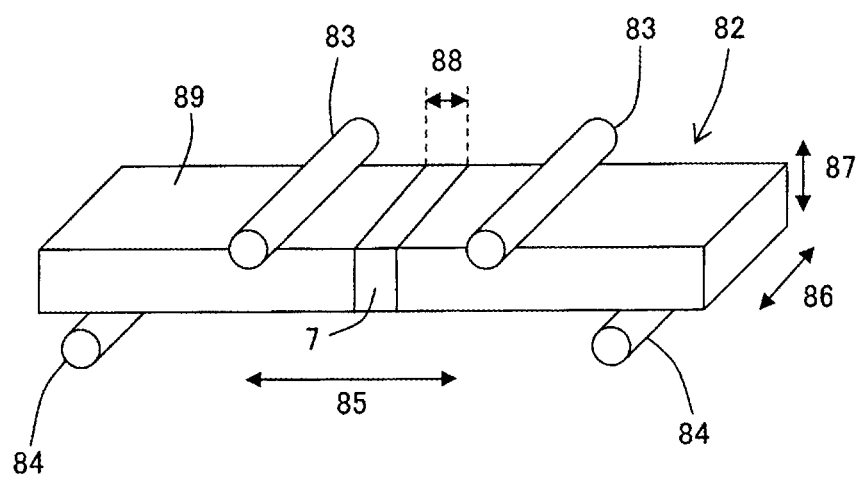
FIG. 14 is a perspective view to explain a measuring method of a strength of a charging material.

The strength of the charging material 7 can be measured by four-point bending of a sample of the honeycomb structure having the charging material at the center thereof and having a thickness:width ratio of 1:2. Furthermore, the Young's modulus of the charging material 7 can be calculated from a stress and a strain when a stress of 20 to 50% of that of the four-point bending strength measurement is loaded. The measurement of the strength of the charging material 7 can be measured by such a method as shown in FIG. 14. FIG. 14 is a perspective view to explain the measuring method of the strength of the charging material. A measurement sample for the strength measurement can be prepared by cutting out a bend testing sample 82 having such a plate shape as shown in FIG. 14 from the honeycomb structure. A portion denoted with a reference numeral 7 in the bend testing sample 82 is the charging material, and a portion denoted with a reference numeral 89 is a part of the honeycomb structure body. In the four-point bending strength measurement, a load is added to two inner fulcrums 83, 83 in a state where the bend testing sample 82 is supported by two outer fulcrums 84, 84, to measure a bending strength of the bend testing sample 82. In the strength measurement shown in FIG. 14, a size of the bend testing sample 82 hardly has an influence on a measured value, as long as a ratio between a thickness 87 and a width 86 of the bend testing sample 82 and a width 88 of the charging material 7 are fixed. Therefore, as the bend testing sample 82, a sample having a size suitable for the measurement of the strength may be prepared. The ratio between the thickness 87 and the width 86 of the bend testing sample 82 is the thickness:the width=1:2. The thickness 87 of the bend testing sample 82 is preferably from 1 to 3 mm. The width 88 of the charging material 7 is a width of one cell formed in the honeycomb structure. When it is difficult to prepare the bend testing sample 82 having a predetermined size from the honeycomb structure, a measuring test piece made of the same material and having the same configuration as in the honeycomb structure of a measurement object may separately be prepared, and the bend testing sample 82 may be cut out and prepared from the prepared measuring test piece. The measuring test piece has a size larger than that required for the bend testing sample 82. The ratio between the thickness 87 and the width 86 of the bend testing sample 82 prepared from the measuring test piece is the thickness:the width=1:2. The thickness 87 of the bend testing sample 82 prepared from the measuring test piece is preferably 7 mm. The width 88 of the charging material 7 of the bend testing sample 82 prepared from the measuring test piece is a width of one cell formed in the honeycomb structure.

A porosity of the charging material 7 is preferably from 20 to 90%, further preferably from 30 to 85%, and especially preferably from 45 to 75%. When the porosity of the charging material 7 is smaller than 20%, the Young's modulus of the charging material 7 rises sometimes. When the porosity of the charging material 7 is in excess of 90%, the strength of the charging material 7 deteriorates sometimes. The porosity is a value measured by a mercury porosimeter.

The charging material 7 preferably contains 2 to 90 mass % of the neck material, further preferably contains 3 to 50 mass % of the neck material, and especially preferably contains 5 to 25 mass % of the neck material. When the mass percentage of the neck material is smaller than 2 mass %, the strength of the charging material 7 deteriorates sometimes. When the neck material is in excess of 90 mass %, the thermal expansion coefficient α2 of the charging material 7 rises sometimes. Furthermore, when an amount of the neck material is excessively large, the strength of the charging material 7 deteriorates sometimes. A mass ratio of the neck material in the charging material 7 can be measured by weighing when a raw material is prepared. Additionally, mass ratios of respective constitutional elements such as the aggregates contained in the charging material 7 can be obtained in conformity with the abovementioned measuring method of the mass ratio of the neck material in the charging material 7. In addition, the mass ratio of the neck material in the charging material 7 can be obtained by observing a cross section of the charging material by an SEM and analyzing an image of the cross section by image processing software. As the image processing software, Win ROOF (trade name) (manufactured by MITANI Corporation) or Photoshop (trade name) (manufactured by Adobe Systems Incorporated) is usable. Specifically, first, a sample to observe "the cross section" is cut out from the charging material. For the cross section of the charging material, concave and convex portions of the cross section are filled with a resin. Furthermore, polishing is performed and the polished surface is observed. Then, a total area of the neck material to a total area of the aggregates and the neck material is calculated from observation results of five view fields of "the cross section" (a magnification of 100 times). In consequence, an area ratio of the neck material in the charging material can be obtained. Additionally, the area ratio of the neck material in the charging material is regarded as a volume ratio of the neck material in the charging material, and the volume ratio of the neck material is subjected to mass conversion in consideration of specific gravities of the aggregates and the neck material, to obtain the mass ratio of the neck material. When the mass ratio of the neck material is obtained, binary processing may be performed to clarify a portion constituting the neck material and portions constituting the aggregates.

The charging material 7 preferably contains the aggregates including silicon carbide and a content of the aggregates including silicon carbide in the charging material 7 is preferably 90 mass % or less. Furthermore, a content of the aggregates including silicon carbide is further preferably 85 mass % or less and especially preferably 75 mass % or less. When the content of the aggregates including silicon carbide is in excess of 90 mass %, the thermal expansion coefficient α2 of the charging material 7 rises sometimes. A lower limit value of the content of the aggregates including silicon carbide is preferably 0 mass % or more.

When the charging material 7 contains the aggregates including silicon carbide, an average particle diameter of the aggregates including silicon carbide is preferably 300 μm or less, further preferably from 1 to 150 μm, and especially preferably from 2 to 50 μm. When the average particle diameter of the aggregates including silicon carbide is excessively small, the thermal expansion coefficient α2 of the charging material 7 rises sometimes, and there is a tendency that the Young's modulus of the charging material 7 rises. When the average particle diameter of the aggregates including silicon carbide is in excess of 300 μm, it is difficult to charge a raw material for the charging material which forms the charging material 7 into the slits 6 sometimes. Furthermore, when the average particle diameter of the aggregates including silicon carbide is in excess of 300 μm, there is the tendency that the strength of the charging material 7 deteriorates. The average particle diameter of the aggregates in the charging material 7 can be obtained by observing the cross section of the charging material by the SEM and analyzing the image of the cross section by the image processing software. As the image processing software, Win ROOF (trade name) (manufactured by MITANI Corporation) or Photoshop (trade name) (manufactured by Adobe Systems Incorporated) is usable. Specifically, first, a sample to observe "the cross section" is cut out from the charging material. For the cross section of the charging material, concave and convex portions of the cross section are filled with a resin. Furthermore, the polishing is performed and the polished surface is observed. Then, particle diameters of the aggregates present in the cross section are measured from observation results of five view fields of "the cross section" (a magnification of 100 times), and an average value of the particle diameters is obtained as "the average particle diameter of the aggregates". When the particle diameters of the aggregates are obtained, binary processing may be performed to clarify a portion constituting the neck material and portions constituting the aggregates. "The average particle diameter of the aggregates" which is measured by the abovementioned image analysis matches "the average particle diameter of the aggregates" which is measured in a state of the raw material for the charging material. Therefore, when the average particle diameter of the aggregates can be measured in the state of the raw material for the charging material, the average particle diameter of the aggregates may be measured during the weighing of the raw material. For example, the average particle diameter of the aggregates in the charging material 7 can be obtained by laser diffractometry.

The charging material 7 may contain the aggregates including cordierite. A mass percentage of the aggregates including cordierite in the charging material 7 is preferably 0 mass % or more, further preferably 10 mass % or more, and especially preferably 50 mass % or more. When the charging material 7 contains the aggregates including cordierite, the thermal expansion coefficient $\alpha 2$ of the charging material 7 can be decreased. That is, the thermal expansion coefficient $\alpha 2$ of the charging material 7 can be adjusted by the aggregates including cordierite. An average particle diameter of the aggregates including cordierite is preferably 300 μm or less, further preferably from 1 to 150 μm, and especially preferably from 2 to 50 μm. When the average particle diameter of the aggregates including cordierite is excessively small, there is the tendency that the Ygs modulus of the charging material 7 rises. When the average particle diameter of the aggregates including cordierite is in excess of 300 μm, it is difficult to charge the raw material for the charging material which forms the charging material 7 into the slits 6 sometimes. Furthermore, when the average particle diameter of the aggregates including cordierite is in excess of 300 μm, there is the tendency that the strength of the charging material 7 deteriorates.

The charging material 7 may contain the aggregates including silicon oxide. A mass percentage of the aggregates including silicon oxide in the charging material 7 is preferably 80 mass % or less, further preferably 45 mass % or less, and especially preferably 25 mass % or less. When the charging material 7 contains the aggregates including silicon oxide, the rise of the thermal expansion coefficient $\alpha 2$ of the charging material 7 can be regulated. For example, when the mass percentage of the aggregates including silicon oxide is smaller than 25 mass %, the thermal expansion coefficient $\alpha 2$ of the charging material 7 rises sometimes, which depends on a type of the aggregates other than silicon oxide. An average particle diameter of the aggregates including silicon oxide is preferably 300 μm or less, further preferably from 1 to 150 μm, and especially preferably from 2 to 50 μm. When the average particle diameter of the aggregates including silicon oxide is excessively small, there is the tendency that the Young's modulus of the charging material 7 rises. When the average particle diameter of the aggregates including silicon oxide is in excess of 300 μm, it is difficult to charge the raw material for the charging material which forms the charging material 7 into the slits 6 sometimes. Furthermore, when the average particle diameter of the aggregates including silicon oxide is in excess of 300 μm, there is the tendency that the strength of the charging material 7 deteriorates.

The aggregates contained in the charging material 7 may be aggregates other than the abovementioned aggregates including silicon carbide, the abovementioned aggregates including cordierite and the abovementioned aggregates including silicon oxide. An example of a component to be included in the aggregates is preferably at least one selected from the group consisting of silicon carbide, cordierite, silicon oxide, aluminum titanate, talc, mica, lithium aluminum titanate, montmorillonite, boehmite, forsterite, kaolin, and mullite. The aggregates preferably include 10 to 100 mass %, further preferably include 50 to 97 mass % and especially preferably include 75 to 95 mass % of at least one selected from the abovementioned group.

As described above, the neck material contained in the charging material 7 may include at least one of silicon oxide and a metal oxide, and the neck material may be constituted of at least one of silicon oxide and the metal oxide. Examples of the metal oxide constituting the neck material include aluminum oxide, titanium oxide, and magnesium oxide.

Furthermore, in the honeycomb structure 100 of the present embodiment, a content ratio of metal silicon of the charging material 7 is preferably 30 mass % or less and further preferably 20 mass % or less. Additionally, it is preferable that metal silicon is not essentially contained. When metal silicon is not essentially contained, it is meant that metal silicon is not intentionally included as a constitutional component of the charging material 7. Therefore, for example, when metal silicon is unavoidably mixed in the charging material 7, it can be considered that metal silicon is not essentially contained. In the conventional honeycomb structure, when the charging material as a stress relaxing member is charged into the slits formed in the honeycomb structure body, the charging material containing the neck material constituted of metal silicon is used sometimes. However, in such a conventional charging material, there has been a restriction on the selection of the material, and it has been difficult to regulate the strength or the Young's modulus of the charging material. In addition, it is necessary to perform a heat treatment of the conventional charging material containing the neck material constituted of metal silicon in an inert atmosphere, and there has been the problem that manufacturing steps of the honeycomb structure become laborious. In the honeycomb structure 100 of the present embodiment, the conductivity is not necessarily required for the charging material, and hence the laborious manufacturing step (e.g., the heat treatment in the inert atmosphere) do not have to be performed, which can simplify the manufacturing steps of the honeycomb structure.

Additionally, in the honeycomb structure 100 of the present embodiment, the charging material 7 preferably does not contain fibrous substances such as inorganic fibers. When the charging material 7 contains the fibrous substances, a viscosity of the raw material for the charging material which forms the charging material 7 heightens, and the raw material for the charging material is hard to be charged into the slits 6 of the honeycomb structure body 4 sometimes. Therefore, the charging material 7 is hard to be equally charged into the slits 6. Furthermore, the fibrous substances are disadvantageously unevenly disposed in the vicinities of open end portions of the slits 6, and a composition of the charging material 7 charged into the slits 6 disadvantageously partially varies. If the charging material 7 contains fibrous substances such as the inorganic fibers, a content ratio of the fibrous substances is preferably 30 mass % or less, and it is preferable that the fibrous substances are not essentially contained. The presence/absence of "fibrous substances such as the inorganic fibers" contained in the charging material can be judged by observing the cross section of the charging material by the SEM and analyzing the image of the cross section by the image processing software. As the image processing software, Win ROOF (trade name) (manufactured by MITANI Corporation) or Photoshop (trade name) (manufactured by Adobe Systems Incorporated) is usable. In the present description, "the fibrous substances" indicate that a value of the maximum length of the substances is 50 μm or more and that aspect ratios of the substances are 5 or more in the above image analysis of the SEM observation. The aspect ratio means a ratio (the maximum length/the minimum length) between the maximum length and a length (hereinafter, this length will be referred to as "the minimum length") in a direction perpendicular to a direction in which the maximum length is measured. When the charging material contains the fibrous substances, a content ratio (mass %) of the fibrous substances can be obtained by the image analysis of the SEM observation. Specifically, an area ratio of the fibrous substances present in the cross section is calculated from observation results of five view fields of "the cross section" of the charging material (a magnification of 100 times). Next, this area ratio is subjected to mass conversion by a method similar to the method used in obtaining the mass ratio of the neck material, and the content ratio (mass %) of the fibrous substances in the charging material is obtained.

In the honeycomb structure 100, at least one of the slits 6 is preferably formed so that the slit does not intersect with a straight line (a center line) L connecting the respective central portions C, C of the pair of electrode members 21, 21 to each other in the cross section perpendicular to the extending direction of the cells 2. The at least one slit 6 is formed as described above, so that it is possible to inhibit the unevenness of the temperature distribution of the honeycomb structure body 4 when the voltage is applied thereto, and it is possible to further improve a thermal shock resistance. Additionally, according to such a constitution, it is possible to inhibit the unevenness of the temperature distribution when the voltage is applied. Furthermore, the honeycomb structure 100, in which the at least one slit 6 is formed so that the slit does not intersect with the straight line connecting the respective central portions C, C of the pair of electrode members 21, 21 to each other in the cross section perpendicular to the extending direction of the cells 2, is also excellent in mechanical strength. In the honeycomb structure 100 shown in FIG. 1 to FIG. 3, each of the six slits 6 is formed so that the slit does not intersect with the straight line L connecting the respective central portions C, C of the pair of electrode members 21, 21 to each other in the cross section perpendicular to the extending direction of the cells 2.

Hereinafter, the slit 6 formed so that the slit does not intersect with the straight line L connecting the respective central portions C, C of the pair of electrode members 21, 21 to each other in the cross section perpendicular to the extending direction of the cells 2 of the honeycomb structure 100 will be referred to as "a non-intersecting slit" sometimes. Furthermore, the slit 6 formed to intersect with the straight line L connecting the respective central portions C, C of the pair of electrode members 21, 21 to each other in the cross section perpendicular to the extending direction of the cells 2 of the honeycomb structure 100 will be referred to as "an intersecting slit" sometimes. In the honeycomb structure 100 of the present embodiment, two or more slits 6 are preferably formed in the honeycomb structure body 4, and the slits 6 of 50% or more of the two or more slits 6 are preferably the non-intersecting slits. In addition, all the slits 6 formed in the honeycomb structure body 4 are further preferably the non-intersecting slits. When the percentage of the non-intersecting slits is 50% or more of all the slits 6, the mechanical strength of the honeycomb structure 100 can be prevented from being deteriorated. That is, the honeycomb structure 100 of the present embodiment is excellent in mechanical strength. When the percentage of the non-intersecting slits is smaller than 50% of all the slits 6, the intersecting slits increase to deteriorate the mechanical strength of the honeycomb structure 100 sometimes. Furthermore, when the percentage of the non-intersecting slits is smaller than 50% of all the slits 6, the intersecting slits increase. Therefore, a flow of a current flowing between the pair of electrode members 21 and 21 is noticeably disturbed by the slits, heating is hindered from being evenly performed, and uneven heating disadvantageously takes place sometimes.

In the honeycomb structure 100 of the present embodiment, a depth of the slit 6 is preferably from 1 to 80% of a radius in "the cross section perpendicular to the extending direction of the cells 2" of the honeycomb structure body 4 (hereinafter referred to as "the radius of the honeycomb structure body" sometimes). Furthermore, the depth of the slit 6 is further preferably from 1 to 60% and especially preferably from 1 to 30% of the radius of the honeycomb structure body. When the depth of the slit 6 is smaller than 1% of the radius of the honeycomb structure body, an effect of improving the thermal shock resistance by the slit 6 is hard to be obtained sometimes. When the depth of the slit 6 is larger than 80% of the radius of the honeycomb structure body, the flow of the current flowing between the pair of electrode members 21 and 21 is noticeably disturbed by the slits, the heating is hindered from being evenly performed, and the uneven heating disadvantageously takes place sometimes. The depth of the slit 6 is a distance from "the open end" of the slit 6 "in the side surface 5" to the deepest position of the slit 6. When a plurality of slits are present, depths of the slits 6 may vary with the slits or all the widths may be the same.

In the honeycomb structure 100 of the present embodiment, a width of the slit 6 is preferably from 0.1 to 5% of a length of an outer circumference of the honeycomb structure body 4 in "the cross section perpendicular to the extending direction of the cells 2" (hereinafter referred to as "a circumferential length of the honeycomb structure body" sometimes). Furthermore, the width of the slit 6 is further preferably from 0.1 to 3% and especially preferably from 0.1 to 1% of the circumferential length of the honeycomb structure body. When the width of the slit 6 is smaller than 0.1% of the circumferential length of the honeycomb structure body, an effect of lowering the thermal shock resistance of the honeycomb structure 100 deteriorates sometimes. When the width of the slit 6 is larger than 5% of the circumferential length of the honeycomb structure body, the mechanical strength of the honeycomb structure 100 deteriorates sometimes. The width of the slit 6 is a length of the slit 6 in "the circumferential direction of the honeycomb structure body 4". "The circumferential direction of the honeycomb structure body 4" is a direction along the outer circumference in "the cross section perpendicular to the extending direction of the cells 2" of the honeycomb structure body 4. When the plurality of slits are present, the widths of the slits 6 may vary with the slits or all the widths may be the same.

In the honeycomb structure 100 of the present embodiment, the length of each of the slits 6 in "the cell extending direction" is preferably the same as the length of the honeycomb structure body in "the cell extending direction". That is, the slit 6 is preferably formed along a space between both the end faces of the honeycomb structure body (along a total length). Furthermore, in another preferable configuration, the length of the slit 6 in "the cell extending direction" is from 5 to 70% of the length of the honeycomb structure body in "the cell extending direction". In terms of the thermal shock resistance, the slit is preferably formed along the total length, but in terms of the strength, a part where the slit is not formed preferably remains. When the slit is not formed along the total length, one end of the slit is preferably positioned in one end face of the honeycomb structure. In this case, the slits may be formed only on the side of the one end face of the honeycomb structure body (see FIG. 9), or the slits may be formed on the sides of both the end faces of the honeycomb structure body (see FIG. 10). When the slits are formed on the sides of both the end faces of the honeycomb structure body, a total length of the slits in "the cell extending direction" is preferably from 5 to 70% of the length of the honeycomb structure body in "the cell extending direction". Furthermore, when the slits are formed only on the side of the one end face of the honeycomb structure body, the honeycomb structure is preferably used so that the end face side on which the slits are formed is turned in a direction in which more thermal shock is applied, during the use of the honeycomb structure. When the plurality of slits are present, the lengths of the slits 6 may vary with the slits or all the lengths may be the same.

Furthermore, when the plurality of slits are present, slit forming patterns (including the numbers of slits), slit depths, slit widths and slit lengths are preferably linearly symmetric via the center line L which is an axis of symmetry.

In the honeycomb structure 100 of the present embodiment, the number of slits 6 is preferably from 1 to 20, further preferably from 1 to 15, and especially preferably from 1 to 10. When the number of slits 6 is in excess of 20, the mechanical strength of the honeycomb structure 100 deteriorates sometimes. In the honeycomb structure 100 shown in FIG. 1 and FIG. 2, the six slits 6 are formed.

In the honeycomb structure 100 of the present embodiment, the slit 6 "in which a position of the open end in the side surface 5 of the honeycomb structure body 4 (the open end of the slit 6) is closest to the electrode member 21" is referred to as "the shortest-distance slit" 6a. A distance D between the electrode member 21 and the "the shortest-distance slit" 6a is preferably from 0.1 to 30 mm, further preferably from 0.5 to 20 mm, and especially preferably from 1 to 10 mm. When the distance D between the electrode member 21 and the "the shortest-distance slit" 6a is shorter than 0.1 mm, the flow of the current is disturbed sometimes and the heating is hard to be evenly performed. When the distance D between the electrode member 21 and the "the shortest-distance slit" 6a is in excess of 30 mm, the effect of improving the thermal shock resistance of the honeycomb structure 100 is hard to be obtained sometimes.

As shown in FIG. 1 and FIG. 2, in the honeycomb structure 100 of the present embodiment, the three slits 6 are formed in each of two regions (a region A and a region B) where "the electrode member 21 is not disposed" in the side surface 5 of the honeycomb structure body 4. In the honeycomb structure 100 of the present embodiment, a distance between the slits facing each other is longer than the depth of the slit. The distance between the slits facing each other is a distance between the slit 6 formed in the region A and the slit 6 formed in the region B.

In the honeycomb structure 100 of the present embodiment, all slit angles of the six slits are 90°. Here, "the slit angle" is defined as follows. As shown in FIG. 2, in the cross section perpendicular to the cell extending direction of the honeycomb structure 100 of the present embodiment, an intersection between the slit 6 and the outer circumference of the honeycomb structure body 4 is a point P. Furthermore, the point P is an end point, and a half line (or a line segment) extending from the point P toward the outside of the outer circumference of the honeycomb structure body 4 and extending in parallel with the center line L is a half line HL. It is to be noted that the center line L is "the straight line connecting the respective central portions of the pair of electrodes to each other" as described above. Additionally, at this time, an angle (an angle of 180° or less) which is not larger in the angles formed by the slits 6 and the half line HL is "a slit angle SA". Here, "the angle which is not larger" means "the smaller angle or the angle which is the same in the case of the same angle". In addition, the half line is a straight line having an end in one direction and endlessly extending in the other direction. Furthermore, when "the half line HL extends toward the outside of the outer circumference of the honeycomb structure body 4", it is meant that the half line HL extends in such a direction that the half line does not pass through the cross section of the honeycomb structure body 4.

In the honeycomb structure 100 of the present embodiment, a material of the partition walls 1 and the circumferential wall 3 preferably includes a silicon-silicon carbide composite material or silicon carbide as a main component, and is further preferably the silicon-silicon carbide composite material or silicon carbide. When "the material of the partition walls 1 and the circumferential wall 3 includes silicon carbide particles and silicon as main components", it is meant that the partition walls 1 and the circumferential wall 3 contain 90 mass % or more of the silicon carbide particles and silicon (a total mass) in the whole material. Here, the silicon-silicon carbide composite material contains the silicon carbide particles as the aggregates, and silicon as a bonding material to bond the silicon carbide particles, and the plurality of silicon carbide particles are preferably bonded by silicon to form pores among the silicon carbide particles. Furthermore, silicon carbide is sintered silicon carbide.

In the honeycomb structure 100 of the present embodiment, as shown in FIG. 1 to FIG. 3, the pair of electrode members 21, 21 are disposed on the side surface 5 of the honeycomb structure body 4. The honeycomb structure 100 of the present embodiment heats, when the voltage is applied between the pair of electrode members 21 and 21. The voltage to be applied is preferably from 12 to 900 V and further preferably from 64 to 600 V, but the voltage to be applied is suitably changeable.

As shown in FIG. 1 to FIG. 3, each of the pair of electrode members 21, 21 is shaped "in the form of the band" extending in the extending direction of the cells 2 of the honeycomb structure body 4. Furthermore, in the cross section perpendicular to the extending direction of the cells 2, the one electrode member 21 in the pair of electrode members 21, 21 is disposed on the side opposite to the other electrode member 21 in the pair of electrode members 21, 21 via the center O of the honeycomb structure body 4. Therefore, when the voltage is applied between the pair of electrode members 21 and 21, an unevenness of the current flowing through the honeycomb structure body 4 can be inhibited, so that the unevenness of the heating in the honeycomb structure body 4 can be inhibited. Additionally, further as shown in FIG. 4, for the honeycomb structure 100 of the present embodiment, in the cross section perpendicular to the extending direction of the cells 2, an angle which is 0.5 time as large as a central angle α of each of the electrode members 21, 21 (an angle θ of 0.5 time the central angle α) is preferably from 15 to 65°. In consequence, the unevenness of the heating in the honeycomb structure body 4 can more effectively be inhibited. As described above, a shape of the electrode member 21 in which "the angle of 0.5 time the central angle α of the electrode member 21 is from 15 to 65° and which extends in the cell extending direction" is one configuration of "the band form". In addition, "the central angle α of the electrode member 21" is, as shown in FIG. 4, an angle formed by two line segments connecting both ends of the electrode member 21 to the center O of the honeycomb structure body 4 in the cross section perpendicular to the cell extending direction. In other words, "the central angle α of the electrode member 21" is an inner angle of a portion of the center O in a shape (a fan shape or the like) formed by "the electrode member 21", "the line segment connecting one end portion of the electrode member 21 to the center O" and "the line segment connecting the other end portion of the electrode member 21 to the center O" in the perpendicular cross section. Here, "the perpendicular cross section" is "the cross section perpendicular to the cell extending direction of the honeycomb structure".

In the cross section perpendicular to the extending direction of the cells 2, an upper limit value of "the angle θ of 0.5 time the central angle α" of each of the electrode members 21, 21 is further preferably 60° and especially preferably 55°. Furthermore, in the cross section perpendicular to the extending direction of the cells 2, a lower limit value of "the angle θ of 0.5 time the central angle α" of each of the electrode members 21, 21 is further preferably 20° and especially preferably 30°. Additionally, "the angle θ of 0.5 time the central angle α" of the one electrode member 21 preferably has a size of 0.8 to 1.2 times and further preferably has a size of 1.0 time (the same size) to "the angle θ of 0.5 time the central angle α" of the other electrode member 21. In consequence, when the voltage is applied between the pair of electrode members 21 and 21, the unevenness of the current flowing through the honeycomb structure body 4 can be inhibited, so that the unevenness of the heating in the honeycomb structure body 4 can be inhibited.

A thickness of the electrode member 21 is preferably from 0.01 to 5 mm and further preferably from 0.01 to 3 mm. In such a range, the heating can evenly be performed. When the thickness of the electrode member 21 is smaller than 0.01 mm, an electric resistance heightens, and the heating cannot evenly be performed sometimes. When the thickness is larger than 5 mm, the electrode member is damaged sometimes during canning.

The electrode member 21 preferably includes silicon carbide particles and silicon as main components, and is further preferably formed by using the silicon carbide particles and silicon as raw materials except usually contained impurities. Here, when "the silicon carbide particles and silicon are included as the main components", it is meant that a total mass of the silicon carbide particles and silicon is 90 mass % or more of a mass of the whole electrode member. In this way, the electrode member 21 includes the silicon carbide particles and silicon as the main components, and a component of the electrode member 21 and a component of the honeycomb structure body 4 thereby become the same component or close components (when a material of the honeycomb structure body is silicon carbide). In consequence, thermal expansion coefficients of the electrode member 21 and the honeycomb structure body 4 have the same value or close values. Furthermore, the material of the electrode member and the material of the honeycomb structure body become the same material or close materials, and hence a bonding strength between the electrode member 21 and the honeycomb structure body 4 also heightens. Therefore, even when the heat stress is applied to the honeycomb structure, the electrode member 21 can be prevented from being peeled from the honeycomb structure body 4, and a bonding portion between the electrode member 21 and the honeycomb structure body 4 can be prevented from being damaged.

As shown in FIG. 1 and FIG. 2, in the honeycomb structure 100 of the present embodiment, each of the pair of electrode members 21, 21 is shaped in the form of the band extending in the cell extending direction of the honeycomb structure body 4 and "extending along the honeycomb structure body between both end portions (between both the end faces 11 and 12)". As described above, the pair of electrode members 21, 21 are disposed to extend along the honeycomb structure body 4 between both the end portions thereof, so that the unevenness of the current flowing through the honeycomb structure body 4 can more effectively be inhibited when the voltage is applied between the pair of electrode members 21 and 21. Furthermore, when the unevenness of the current flowing through the honeycomb structure body 4 is inhibited, the unevenness of the heating in the honeycomb structure body 4 can more effectively be inhibited. When "the electrode member 21 is formed to extend along the honeycomb structure body 4 between both the end portions thereof", it is meant that one end portion of the electrode member 21 comes in contact with a peripheral edge of the first end face 11 of the honeycomb structure body 4 and that the other end portion of the electrode member 21 comes in contact with a peripheral edge of the second end face 12 of the honeycomb structure body 4.

In the honeycomb structure 100 of the present embodiment, a state where both the end portions of the electrode member 21 in "the extending direction of the cells 2 of the honeycomb structure body 4" do not come in contact with the peripheral edges of both the end faces of the honeycomb structure body 4 is also a preferable configuration. That is, the state where both the end portions of the electrode member 21 do not reach the peripheral edge of the first end face 11 and the peripheral edge of the second end face 12 of the honeycomb structure body 4 is also the preferable configuration. In addition, a state where the one end portion of the electrode member 21 comes in contact with the first end face 11 of the honeycomb structure body 4 and the other end portion of the electrode member 21 does not come in contact with the second end face 12 of the honeycomb structure body 4 is another preferable configuration. As described above, for the configuration in which the electrode member 21 is disposed, various changes are possible in accordance with a use configuration of the honeycomb structure 100.

Figure 12:
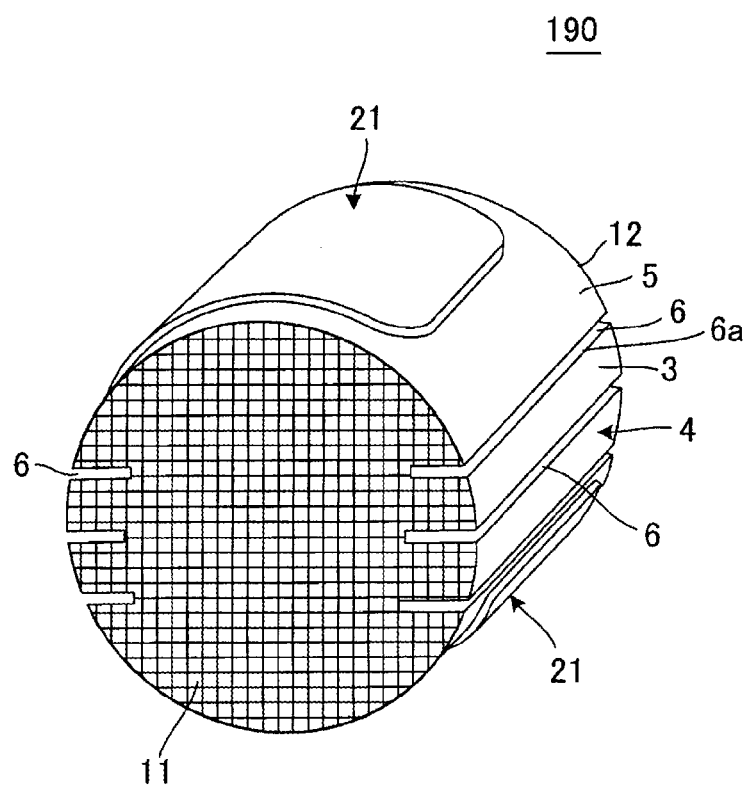
FIG. 12 is a perspective view schematically showing a honeycomb structure in which both end portions in each of a pair of electrode members do not come in contact with end portions of a honeycomb structure body.

In the honeycomb structure of the present embodiment, for example, as shown in FIG. 1 to FIG. 3, the electrode member 21 has such a shape as obtained by bending a planar rectangular member along an outer circumference of a columnar shape. Here, a shape obtained when the bent electrode member 21 is deformed into a planar member which is not bent is referred to as "a planar shape" of the electrode member 21. The above "planar shape" of the electrode member 21 shown in FIG. 1 to FIG. 3 is the rectangular shape. Furthermore, "the circumferential shape of the electrode member" means "the circumferential shape in the planar shape of the electrode member". In the honeycomb structure of the present embodiment, as shown in FIG. 1 to FIG. 3, the circumferential shape of the band-like electrode member 21 may be rectangular, but the circumferential shape of the band-like electrode member 21 may be a shape in which corner portions of the rectangular shape are formed in a curved manner. In addition, the circumferential shape of the band-like electrode member 21 may be a shape in which the corner portions of the rectangular shape are linearly chamfered. FIG. 12 shows an example of a honeycomb structure 190 where both end portions of each of a pair of electrode members 21, 21 do not come in contact with peripheral edges of end faces of a honeycomb structure body 4. In the honeycomb structure 190 shown in FIG. 12, a circumferential shape of each of the band-like electrode members 21 is a shape in which "corner portions of a rectangular shape are formed in a curved manner".

An electrical resistivity of the electrode member 21 is preferably from 0.1 to 100 $\Omega$cm and further preferably from 0.1 to 50 $\Omega$cm. When the electrical resistivity of the electrode member 21 is in such a range, each of the pair of electrode members 21, 21 effectively performs a function of an electrode in a piping line through which a high-temperature exhaust gas flows. When the electrical resistivity of the electrode member 21 is smaller than 0.1 $\Omega$cm, a temperature of the honeycomb structure body in the vicinity of each of both ends of the electrode member 21 easily rises sometimes in the cross section perpendicular to the cell extending direction. When the electrical resistivity of the electrode member 21 is larger than 100 $\Omega$cm, the current is hard to flow, and hence the electrode member is hard to perform the function of the electrode sometimes. The electrical resistivity of the electrode member is a value at 400° C.

A porosity of the electrode member 21 is preferably from 30 to 60% and further preferably from 30 to 55%. When the porosity of the electrode member 21 is in such a range, a suitable electrical resistivity can be obtained. When the porosity of the electrode member 21 is lower than 30%, the electrode member is deformed sometimes during manufacturing. When the porosity of the electrode member 21 is higher than 60%, the electrical resistivity excessively heightens sometimes. The porosity is a value measured by the mercury porosimeter.

In the honeycomb structure 100 of the present embodiment, a partition wall thickness is from 50 to 200 μm and preferably from 70 to 130 μm. When the partition wall thickness is in such a range, a pressure loss during the passing of the exhaust gas can be inhibited from being excessively large also in a case where the honeycomb structure 100 is used as a catalyst carrier and a catalyst is loaded onto the honeycomb structure. When the partition wall thickness is smaller than 50 μm, the strength of the honeycomb structure deteriorates sometimes. When the partition wall thickness is larger than 200 μm, the pressure loss during the passing of the exhaust gas enlarges sometimes in the case where the honeycomb structure 100 is used as the catalyst carrier and the catalyst is loaded thereonto.

In the honeycomb structure 100 of the present embodiment, a cell density is preferably from 40 to 150 cells/cm$^2$ and further preferably from 70 to 100 cells/cm$^2$. When the cell density is in such a range, a purification performance of the catalyst can be heightened in a state where the pressure loss during the passing of the exhaust gas is reduced. When the cell density is lower than 40 cells/cm$^2$, a catalyst loading area is reduced sometimes. When the cell density is higher than 150 cells/cm$^2$, the pressure loss during the passing of the exhaust gas enlarges sometimes in the case where the honeycomb structure 100 is used as the catalyst carrier and the catalyst is loaded thereonto.

In the honeycomb structure 100 of the present embodiment, an average particle diameter of the silicon carbide particles (the aggregates) constituting the honeycomb structure body 4 is preferably from 3 to 50 μm and further preferably from 3 to 40 μm. When the average particle diameter of the silicon carbide particles constituting the honeycomb structure body 4 is in such a range, the electrical resistivity of the honeycomb structure body 4 at 400° C. can be from 1 to 200 $\Omega$cm. When the average particle diameter of the silicon carbide particles is smaller than 3 μm, the electrical resistivity of the honeycomb structure body 4 enlarges sometimes. When the average particle diameter of the silicon carbide particles is larger than 50 μm, the electrical resistivity of the honeycomb structure body 4 is reduced sometimes. Furthermore, when the average particle diameter of the silicon carbide particles is larger than 50 μm, an extruding die is clogged with a forming raw material sometimes during the extrusion of a honeycomb formed body. The average particle diameter of the silicon carbide particles is a value measured by the laser diffractometry.

The honeycomb structure body 4 for use in the honeycomb structure 100 of the present embodiment heats by Joule heat, and for example, there is not any special restriction on an electrical resistivity of the honeycomb structure body. For example, the electrical resistivity of the honeycomb structure body 4 is preferably from 1 to 200 $\Omega$cm and further preferably from 10 to 100 $\Omega$cm. Furthermore, the electrical resistivity of the honeycomb structure body 4 can be selected in accordance with a use application to use the honeycomb structure 100. The electrical resistivity of the honeycomb structure body is a value measured by a four-terminal method.

In the honeycomb structure 100 of the present embodiment, the electrical resistivity of the electrode member 21 is preferably lower than the electrical resistivity of the honeycomb structure body 4. Furthermore, the electrical resistivity of the electrode member 21 is further preferably 20% or less and especially preferably from 1 to 10% of the electrical resistivity of the honeycomb structure body 4. The electrical resistivity of the electrode member 21 is 20% or less of the electrical resistivity of the honeycomb structure body 4, and the electrode member 21 thereby more effectively functions as the electrode.

In the honeycomb structure 100 of the present embodiment, when a material of the honeycomb structure body 4 is a silicon-silicon carbide composite material, a ratio of "a mass of silicon as a bonding material" contained in the honeycomb structure body 4 to a total of "a mass of silicon carbide particles as aggregates" contained in the honeycomb structure body 4 and "the mass of silicon as the bonding material" contained in the honeycomb structure body 4 is preferably from 10 to 40 mass % and further preferably from 15 to 35 mass %. When the mass percentage is lower than 10 mass %, the strength of the honeycomb structure deteriorates sometimes. When the mass percentage is higher than 40 mass %, a shape cannot be held during firing.

A porosity of the partition walls 1 of the honeycomb structure body 4 is preferably from 35 to 60% and further preferably from 35 to 45%. When the porosity is smaller than 35%, the deformation thereof is disadvantageously noticeably occurred sometimes during the firing. When the porosity is in excess of 60%, the strength of the honeycomb structure deteriorates sometimes. The porosity is a value measured by the mercury porosimeter.

An average pore diameter of the partition walls 1 of the honeycomb structure body 4 is preferably from 2 to 15 µm and further preferably from 4 to 8 µm. When the average pore diameter is smaller than 2 µm, the electrical resistivity excessively becomes larger sometimes. When the average pore diameter is larger than 15 µm, the electrical resistivity excessively becomes smaller sometimes. The average pore diameter is a value measured by the mercury porosimeter.

In addition, a thickness of the circumferential wall 3 constituting the outermost circumference of the honeycomb structure 100 of the present embodiment is preferably from 0.1 to 2 mm. When the thickness is smaller than 0.1 mm, the strength of the honeycomb structure 100 deteriorates sometimes. When the thickness is larger than 2 mm, an area of each partition wall onto which the catalyst is loaded is reduced sometimes.

In the honeycomb structure 100 of the present embodiment, a shape of the cells 2 in the cross section perpendicular to the extending direction of the cells 2 is preferably a quadrangular shape, a hexagonal shape, an octagonal shape, or any combination of these shapes. Among these shapes, a square shape and the hexagonal shape are preferable. When the cell shape is such a shape, the pressure loss during the passing of the exhaust gas through the honeycomb structure 100 is reduced, and the purification performance of the catalyst becomes excellent.

There is not any special restriction on a shape of the honeycomb structure (a shape of the honeycomb structure body) of the present embodiment. Examples of the shape include a pillar shape in which a bottom surface has a circular shape (a columnar shape), a pillar shape in which the bottom surface has an oval shape, and a pillar shape in which the bottom surface has a polygonal shape (a quadrangular shape, a pentangular shape, a hexagonal shape, a heptagonal shape, an octagonal shape or the like). Furthermore, for a size of the honeycomb structure, an area of the bottom surface is preferably from 2000 to 20000 $mm^2$ and further preferably from 4000 to 10000 $mm^2$. Additionally, a length of the honeycomb structure in a central axis direction is preferably from 50 to 200 mm and further preferably from 75 to 150 mm.

An isostatic strength of the honeycomb structure 100 of the present embodiment is preferably 1 MPa or more and further preferably 3 MPa or more. The isostatic strength preferably has a larger value, but when a material, a structure or the like of the honeycomb structure 100 is taken into consideration, an upper limit of the strength is about 6 MPa. When the isostatic strength is smaller than 1 MPa, the honeycomb structure is easily damaged sometimes during the use of the honeycomb structure as the catalyst carrier or the like. The isostatic strength is a value measured under a hydrostatic pressure in water.

The honeycomb structure 100 of the present embodiment is preferably used as the catalyst carrier onto which the catalyst is loaded.

As shown in FIG. 1, in the honeycomb structure 100 of the present embodiment, the charging material 7 is disposed in at least a part of a space of the slit 6. Furthermore, two or more slits 6 are preferably formed in the honeycomb structure body 4, and the charging material is preferably disposed in slits of 50% or more of the two or more slits 6. Additionally, the charging material is preferably disposed in all of "the two or more slits 6" formed in the honeycomb structure body 4. In addition, the charging material 7 is preferably disposed in all "the spaces of the slits 6". In the honeycomb structure 100 shown in FIG. 1, six slits 6 are formed. Furthermore, in each of all the slits 6, the charging material 7 is disposed in the whole space of the slits 6. As described above, the charging material is disposed in the slits 6, so that the isostatic strength of the honeycomb structure can improve. When the charging material "is disposed in at least a part", the charging material may be disposed in "a part" of the slit in a depth direction thereof, in "a part" of the slit in the length direction thereof, or in any combination of these parts.

Figure 5:
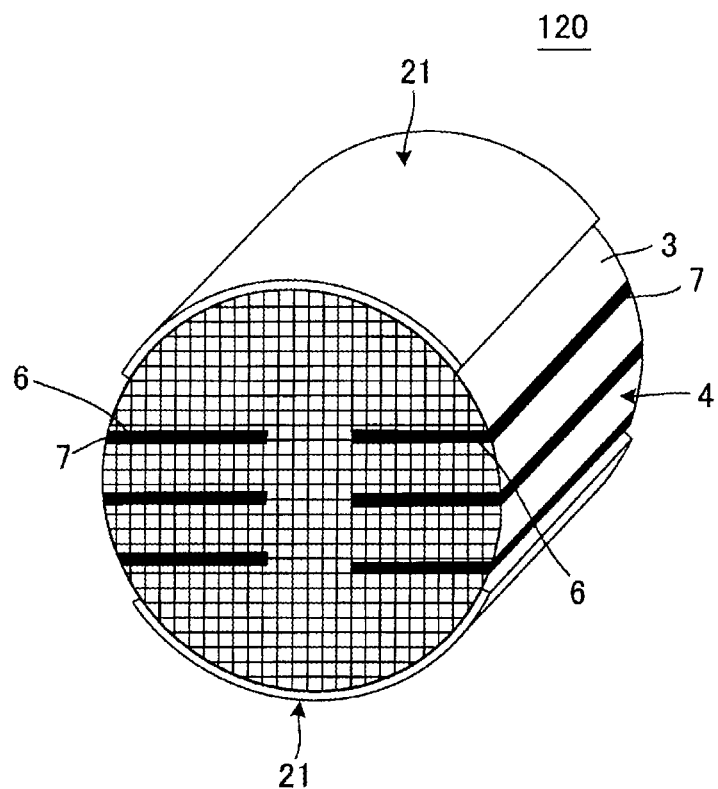
FIG. 5 is a perspective view schematically showing another embodiment of the honeycomb structure of the present invention.

Next, another embodiment of the honeycomb structure of the present invention will be described. As shown in FIG. 5, in a honeycomb structure 120 of the present embodiment, a distance between slits facing each other is shorter than a depth of each slit 6 of the honeycomb structure 100 shown in FIG. 1. When the depth of the slit 6 increases, a thermal shock resistance improves, but a current does not easily flow and hence heating is hard to be evenly performed. Therefore, in consideration of a balance between these problems, the depth of each slit is preferably suitably determined. In the honeycomb structure 120 shown in FIG. 5, a charging material 7 is charged into all the slits 6, but the charging material 7 may be charged into at least one slit 6. For example, in the honeycomb structure 120 shown in FIG. 5, the slits 6 into which the charging material 7 is not charged may be present among the six slits 6. FIG. 5 is a perspective view schematically showing this embodiment of the honeycomb structure of the present invention.

Figure 6:
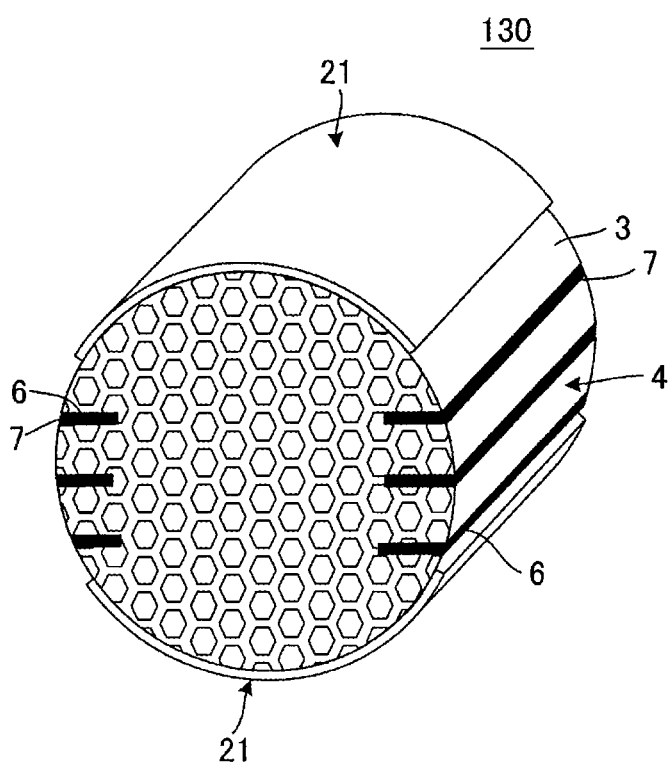
FIG. 6 is a perspective view schematically showing still another embodiment of the honeycomb structure of the present invention.

Next, still another embodiment of the honeycomb structure of the present invention will be described. As shown in FIG. 6, in a honeycomb structure 130 of the present embodiment, a shape of each cell is hexagonal in a cross section perpendicular to an extending direction of the cells of the honeycomb structure 100 shown in FIG. 1. Hereinafter, "the shape of each cell" in the cross section perpendicular to the cell extending direction will be referred to simply as "the cell shape" sometimes. When the cell shape is hexagonal, there is the advantage that a stress from an outer circumference is scattered. In the honeycomb structure 130 of the present embodiment, a charging material 7 is charged into all slits 6, but the charging material 7 does not have to be charged into all the slits 6. FIG. 6 is a perspective view schematically showing this embodiment of the honeycomb structure of the present invention.

Figure 7:
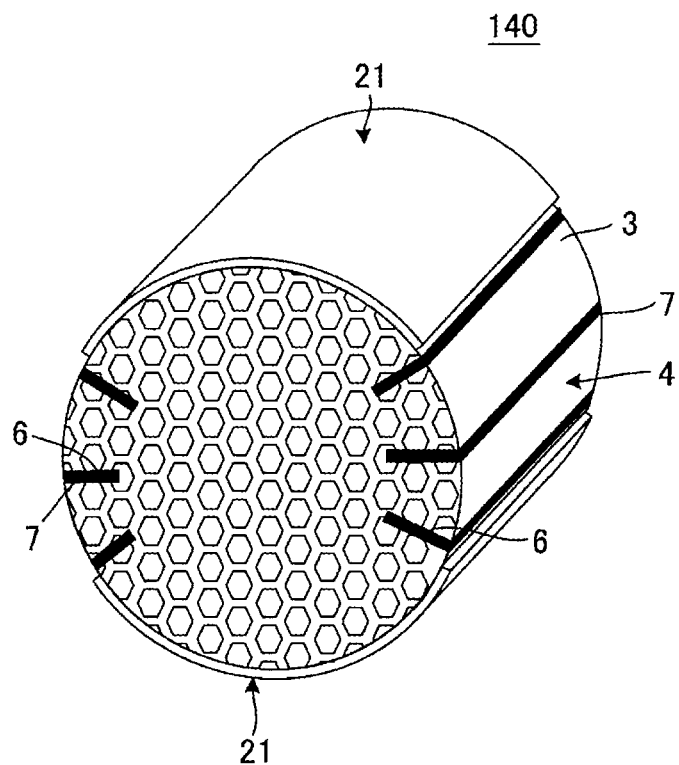
FIG. 7 is a perspective view schematically showing a further embodiment of the honeycomb structure of the present invention.

Next, a further embodiment of the honeycomb structure of the present invention will be described. As shown in FIG. 7, in a honeycomb structure 140 of the present embodiment, each slit angle is changed from that of the honeycomb structure 130 shown in FIG. 6. In the honeycomb structure 140 of the present embodiment, a charging material 7 is charged into all slits 6, but the charging material 7 does not have to be charged into all the slits 6. FIG. 7 is a perspective view schematically showing this further embodiment of the honeycomb structure of the present invention.

Figure 8:
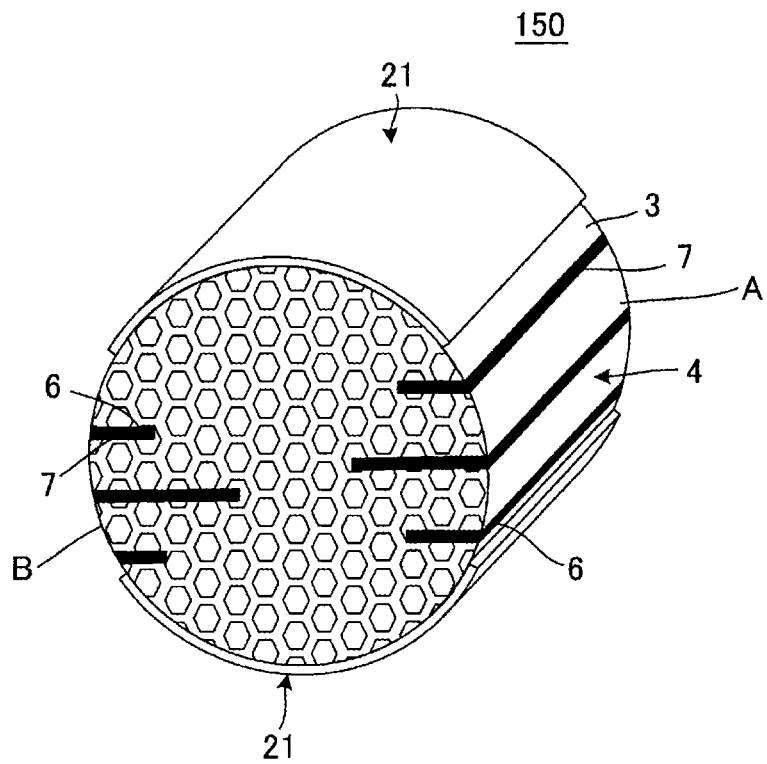
FIG. 8 is a perspective view schematically showing a further embodiment of the honeycomb structure of the present invention.

Next, a further embodiment of the honeycomb structure of the present invention will be described. As shown in FIG. 8, in a honeycomb structure 150 of the present embodiment, a slit depth of part of slits in the honeycomb structure 130 shown in FIG. 6 is increased. Specifically, in the honeycomb structure 150 of the present embodiment, a depth of a slit positioned in a middle is larger among the three slits formed in each of a region A and a region B. In the honeycomb structure 150 of the present embodiment, a charging material 7 is charged into all slits 6, but the charging material 7 does not have to be charged into all the slits 6. FIG. 8 is a perspective view schematically showing the further embodiment of the honeycomb structure of the present invention.

Figure 9:
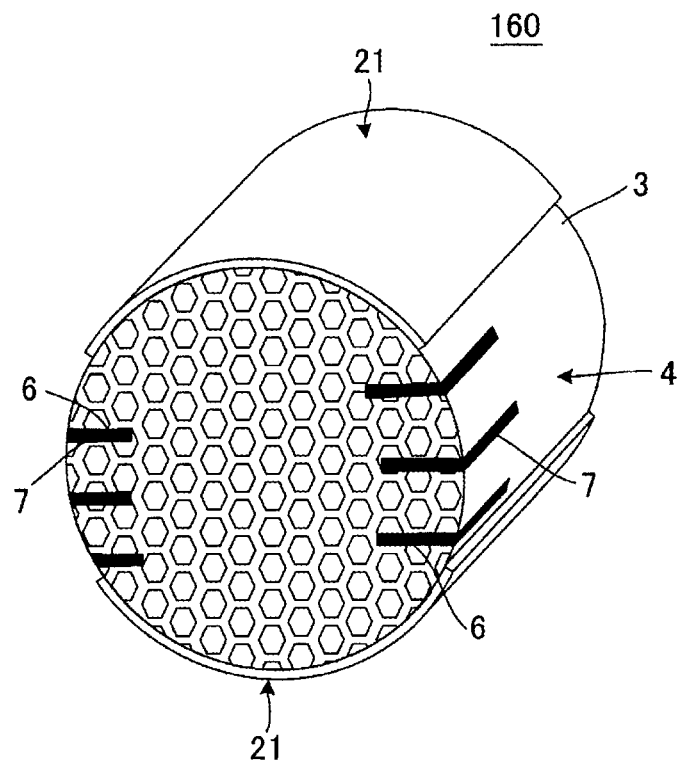
FIG. 9 is a perspective view schematically showing a further embodiment of the honeycomb structure of the present invention.

Next, a further embodiment of the honeycomb structure of the present invention will be described. As shown in FIG. 9, in a honeycomb structure 160 of the present embodiment, a length of the slit 6 in "an extending direction of cells 2" in the honeycomb structure 130 shown in FIG. 6 is shortened. Specifically, in the honeycomb structure 160 of the present embodiment, slits 6 are formed so that the slits are opened in a side surface 5 and a first end face of a honeycomb structure body 4 and are not opened in a second end face. Therefore, it can be considered that the slits 6 are formed only in one end portion of the honeycomb structure body 4 of the honeycomb structure. A length of the slit 6 in "an extending direction of cells 2" is shorter than a length of the honeycomb structure body 4 in "the extending direction of the cells 2". In the honeycomb structure 160 of the present embodiment, a charging material 7 is charged into all the slits 6, but the charging material 7 does not have to be charged into all the slits 6. FIG. 9 is a perspective view schematically showing the further embodiment of the honeycomb structure of the present invention.

Figure 10:
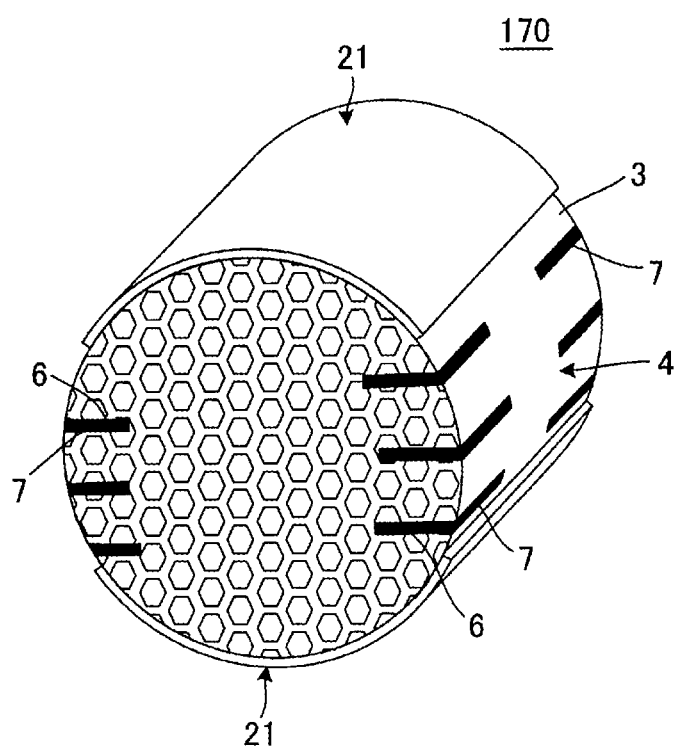
FIG. 10 is a perspective view schematically showing a further embodiment of the honeycomb structure of the present invention.

Next, a further embodiment of the honeycomb structure of the present invention will be described. As shown in FIG. 10, in a honeycomb structure 170 of the present embodiment, the slits 6 each having a short length in "the extending direction of the cells 2" in the honeycomb structure 160 shown in FIG. 9 are formed in both end portions of a honeycomb structure body. In the honeycomb structure 170 of the present embodiment, a charging material 7 is charged into all slits 6, but the charging material 7 does not have to be charged into all the slits 6. FIG. 10 is a perspective view schematically showing the further embodiment of the honeycomb structure of the present invention.

Figure 11:
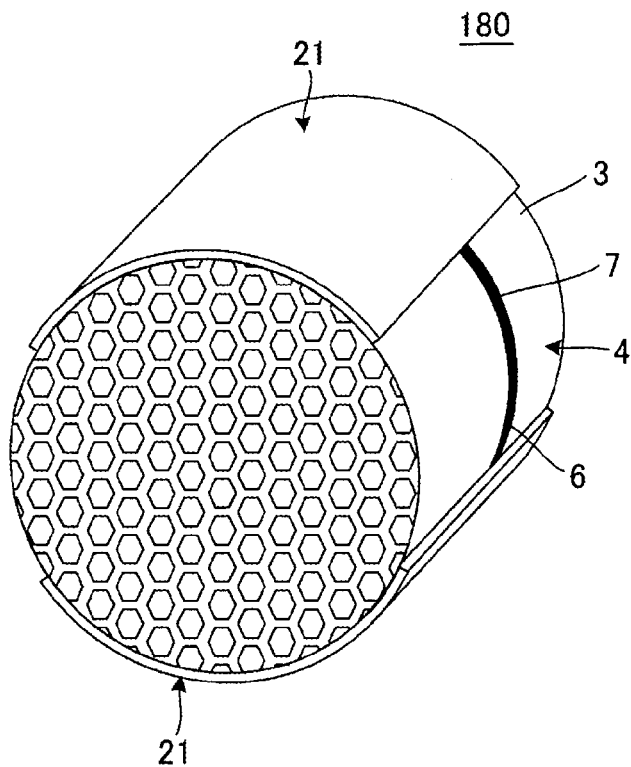
FIG. 11 is a perspective view schematically showing a further embodiment of the honeycomb structure of the present invention.

Next, a further embodiment of the honeycomb structure of the present invention will be described. As shown in FIG. 11, in a honeycomb structure 180 of the present embodiment, six slits extending in "the cell extending direction" in the honeycomb structure 130 shown in FIG. 6 are not formed, but one slit parallel to end faces of a honeycomb structure body 4 is formed. In the honeycomb structure 180 of the present embodiment, a slit 6 is opened in a side surface of the honeycomb structure body 4, and is not opened in the end faces of the honeycomb structure body 4, but is formed in parallel with the end faces of the honeycomb structure body 4. In the honeycomb structure 180 of the present embodiment, a charging material 7 is charged into all the slit 6, but the charging material 7 does not have to be charged into all the slit 6. FIG. 11 is a perspective view schematically showing the further embodiment of the honeycomb structure of the present invention.

Figure 13:
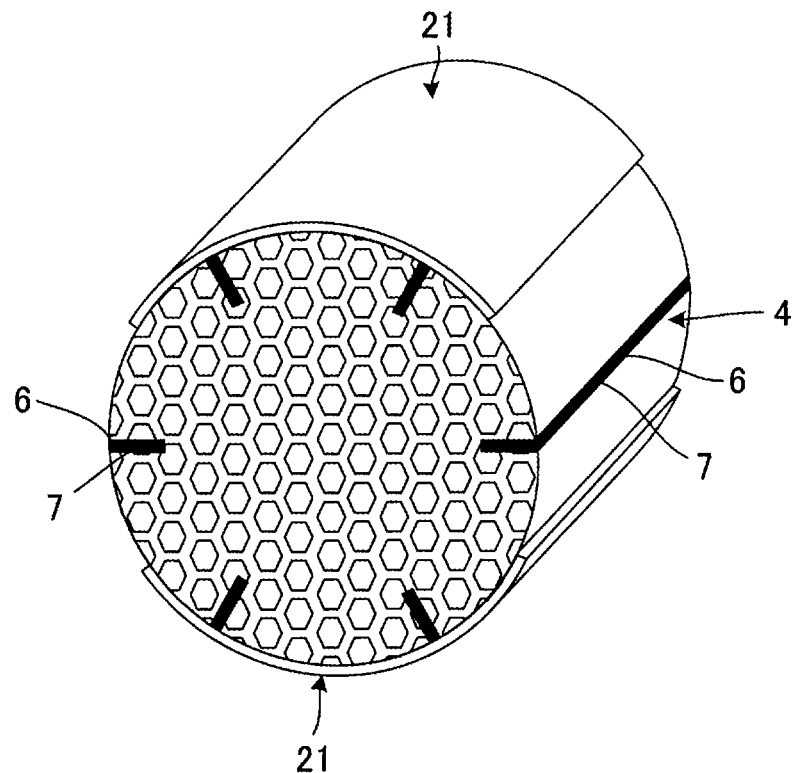
FIG. 13 is a perspective view schematically showing a still further embodiment of the honeycomb structure of the present invention.

Next, a still further embodiment of the honeycomb structure of the present invention will be described. As shown in FIG. 13, in a honeycomb structure 200 of the present embodiment, four slits close to electrode members 21 are formed at positions covered with the electrode members 21 among six slits extending in "the cell extending direction" in the honeycomb structure 140 shown in FIG. 7. In the honeycomb structure 200 of the present embodiment, a charging material 7 is charged into all slits 6, but the charging material 7 does not have to be charged into all the slits 6. FIG. 13 is a perspective view schematically showing the still further embodiment of the honeycomb structure of the present invention.

(2) Manufacturing Method of Honeycomb Structure:

Next, a method of manufacturing the honeycomb structure of the present invention (hereinafter referred to simply as "the manufacturing method of the honeycomb structure") will be described. The manufacturing method of the honeycomb structure is not limited to a manufacturing method described in the following. An example of the manufacturing method of the honeycomb structure is a manufacturing method including an A1 step of obtaining a honeycomb formed body with an electrode member raw material, an A2 step of forming slits, an A3 step of firing the honeycomb formed body, and an A4 step of charging a raw material for a charging material.

The A1 step is a step of applying an electrode member forming raw material to the honeycomb formed body which is a precursor of a pillar honeycomb structure body to obtain the honeycomb formed body with the electrode member raw material. The pillar honeycomb structure body is the honeycomb structure body 4 having the partition walls 1 defining the plurality of cells 2 extending from the first end face 11 to the second end face 12, and the circumferential wall 3 positioned at the outermost circumference as shown in FIG. 1 to FIG. 3. Furthermore, the honeycomb formed body is the honeycomb structure body before fired to prepare the honeycomb structure body 4 described above.

The honeycomb formed body can be prepared in conformity with a preparing method of a honeycomb formed body in a known honeycomb structure manufacturing method. For example, first, metal silicon powder (metal silicon), a binder, a surfactant, a pore former, water and the like are added to silicon carbide powder (silicon carbide) to prepare a forming raw material. Next, the obtained forming raw material is kneaded to form a kneaded material. Next, the kneaded material is extruded to prepare the honeycomb formed body. During the extrusion, a die having a desirable whole shape, cell shape, partition wall thickness, cell density and the like is preferably used. Next, the obtained honeycomb formed body is preferably dried. Hereinafter, the dried honeycomb formed body will be referred to as "a honeycomb dried body" sometimes. When a length of the honeycomb formed body (or the honeycomb dried body) in a central axis direction is not a desirable length, the desirable length is preferably obtained by cutting both end portions of the honeycomb formed body.

Next, an electrode member forming raw material to form each electrode member is prepared. When main components of the electrode member are silicon carbide and silicon, the electrode member forming raw material is preferably formed by adding predetermined additives to the silicon carbide powder and the silicon powder, followed by the kneading. Next, the obtained electrode member forming raw material is applied to a side surface of the dried honeycomb formed body (the honeycomb dried body), to obtain the honeycomb formed body with the electrode member raw material. A method of preparing the electrode member forming raw material and a method of applying the electrode member forming raw material to the honeycomb formed body can be performed in conformity with the known honeycomb structure manufacturing method.

As Modification 1 of the manufacturing method of the honeycomb structure, in the A1 step, the honeycomb formed body may be fired once before the electrode member forming raw material is applied. That is, in Modification 1, the honeycomb formed body is fired to prepare a honeycomb fired body, and the electrode member forming raw material is applied to the honeycomb fired body to obtain the honeycomb fired body with the electrode member raw material in place of the honeycomb formed body with the electrode member raw material.

The A2 step is a step of forming slits opened in the side surface of the honeycomb formed body with the electrode member raw material. The slits are preferably formed by using Leutor or the like. The slits are formed to be opened in the side surface of the honeycomb formed body with the electrode member raw material. As each of the slits to be formed in the honeycomb formed body with the electrode member raw material, a slit similar to the preferable configuration of each slit to be formed in the honeycomb structure of the present invention described above is preferable. For example, in the honeycomb formed body with the electrode member raw material, the slits similar to the slits 6 formed in the honeycomb structure 100 shown in FIG. 1 are preferably formed.

The A3 step is a step of firing the honeycomb formed body with the electrode member raw material to obtain the honeycomb fired body. The honeycomb formed body with the electrode member raw material may be dried before the body is fired. Furthermore, to remove the binder and the like in the raw material for the charging material, calcinating may be performed before the firing. As firing conditions, heating is preferably performed at 1400 to 1500° C. in an inert atmosphere of nitrogen, argon or the like for one to 20 hours. In addition, after the firing, an oxidation treatment is preferably performed at 1200 to 1350° C. for one to ten hours to improve a durability. There is not any special restriction on a calcinating and firing method, and the firing can be performed by using an electric furnace, a gas furnace or the like.

Furthermore, in the A3 step, the honeycomb formed body with the electrode member raw material may be subjected to the heat treatment at 300 to 1500° C. This heat treatment may be a heat treatment included in the calcinating and the firing which has hitherto been described, or may be performed separately from the calcinating and the firing.

The A4 step is a step of charging the raw material for the charging material into the slits formed in the honeycomb fired body. In the A4 step, first, the raw material for the charging material is prepared. The raw material for the charging material is a raw material to prepare the charging material in the honeycomb structure of the present invention which has hitherto been described. For example, the raw material for the charging material can be obtained by kneading a mixture obtained by mixing aggregates, a neck material, a binder, a surfactant, a pore former, water and the like. The raw material for the charging material is preferably slurried. The aggregates and the neck material to be included in the raw material for the charging material are preferably similar to the preferable configuration of the charging material in the honeycomb structure of the present invention which has hitherto been described. In the manufacturing method of the honeycomb structure, the raw material for the charging material is prepared so that a ratio ($\alpha 2/\alpha 1$) of a thermal expansion coefficient $\alpha 2$ of the charging material after the abovementioned heat treatment to a thermal expansion coefficient $\alpha 1$ of the honeycomb structure body of the finally obtained honeycomb structure is from 0.6 to 1.5.

As the aggregates, it is preferable to use aggregates including at least one selected from the group consisting of silicon carbide, cordierite, aluminum titanate, talc, mica, lithium aluminum titanate, montmorillonite, boehmite, forsterite, kaolin, and mullite. In addition, as the aggregates, a plurality of types of aggregates including at least one selected from the group may be prepared, and the plurality of types of aggregates may be mixed and used.

A content ratio of the aggregates in the raw material for the charging material and a content ratio of the neck material in the raw material for the charging material are preferably similar to the preferable configuration of the charging material in the honeycomb structure of the present invention. The content ratio of the aggregates and the content ratio of the neck material can be adjusted to suitably obtain a preferable numeric range in a stage where the raw material for the charging material is prepared. The average particle diameter of the aggregates is preferably similar to the preferable configuration of the charging material in the honeycomb structure of the present invention, and when the raw material for the charging material is prepared, the aggregates having a preferable average particle diameter can be selected and used.

Examples of the binder for use in the raw material for the charging material include methylcellulose, hydroxypropyl methylcellulose, hydroxypropoxyl cellulose, hydroxyethyl cellulose, carboxymethylcellulose, polyvinyl alcohol, and glycerin. Among these examples, methylcellulose and hydroxypropoxyl cellulose are preferably used together. A content of the binder is preferably from 0 to 25 parts by mass, when a total mass of the aggregates and the neck material is 100 parts by mass.

A content of the water is preferably from 15 to 75 parts by mass, when the total mass of the aggregates and the neck material is 100 parts by mass.

As the surfactant for use in the raw material for the charging material, ethylene glycol, dextrin, fatty acid soap, polyalcohol or the like is usable. These surfactants may be used alone, or any combination of these two or more surfactants may be used. A content of the surfactant is preferably from 0 to 15 parts by mass, when the total mass of the aggregates and the neck material is 100 parts by mass.

There is not any special restriction on the pore former for use in the raw material for the charging material, as long as the pore former becomes pores after fired, and examples of the pore former include graphite, starch, a foamable resin, a water absorbable resin, and silica gel. A content of the pore former is preferably from 0 to 85 parts by mass, when the total mass of the aggregates and the neck material is 100 parts by mass. An average particle diameter of the pore former is preferably from 3 to 150 µm. When the average particle diameter is smaller than 3 µm, the pores cannot sufficiently be formed sometimes. When the average particle diameter is larger than 150 µm, large pores are easily formed, which causes the strength deterioration sometimes. The average particle diameter of the pore former is a value measured by the laser diffractometry.

There is not any special restriction on a method of charging the raw material for the charging material into the slits formed in the honeycomb formed body with the electrode member raw material, but an example of the method is a method of charging the raw material for the charging material into the slits by use of a syringe or the like. According to such a method, the raw material for the charging material can equally be charged into the slits. Needless to say, the raw material for the charging material may be charged into the slits by use of a spatula or the like.

EXAMPLES

Hereinafter, the present invention will further specifically be described in accordance with examples, but the present invention is not limited to these examples.

Example 1

Silicon carbide (SiC) powder and metal silicon (Si) powder were mixed at a mass ratio of 80:20 to prepare a silicon carbide-metal silicon mixture. Then, to the silicon carbide-metal silicon mixture, hydroxypropyl methylcellulose as a binder and a water absorbable resin as a pore former were added and water was also added to obtain a forming raw material, and the forming raw material was kneaded by using a vacuum pugmill to prepare a columnar kneaded material. A content of the binder was 7 parts by mass, when a total of the silicon carbide (SiC) powder and the metal silicon (Si) powder was 100 parts by mass. A content of the pore former was 3 parts by mass, when the total of the silicon carbide (SiC) powder and the metal silicon (Si) powder was 100 parts by mass. A content of the water was 42 parts by mass, when the total of the silicon carbide (Sic) powder and the metal silicon (Si) powder was 100 parts by mass. An average particle diameter of the silicon carbide powder was 20 µm and an average particle diameter of the metal silicon powder was 6 µm. Furthermore, an average particle diameter of the pore former was 20 µm. The average particle diameters of silicon carbide, metal silicon and the pore former are values measured by laser diffractometry.

The obtained columnar kneaded material was formed by using an extrusion machine to obtain a honeycomb formed body. The obtained honeycomb formed body was dried by high-frequency dielectric heating, and then dried at 120° C. for two hours by use of a hot air dryer, and both end faces of the body were cut as much as predetermined amounts.

Next, silicon carbide (SiC) powder and metal silicon (Si) powder were mixed at a mass ratio of 60:40, and to this mixture, hydroxypropyl methylcellulose as a binder, glycerin as a moisture retaining agent and a surfactant as a dispersing agent were added and water was also added, followed by the mixing. The mixture was kneaded to obtain an electrode member forming raw material. A content of the binder was 0.5 part by mass, when a total of the silicon carbide (SiC) powder and the metal silicon (Si) powder was 100 parts by mass. A content of glycerin was 10 parts by mass, when the total of the silicon carbide (SiC) powder and the metal silicon (Si) powder was 100 parts by mass. A content of the surfactant was 0.3 part by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 52 µm and an average particle diameter of the metal silicon powder was 6 µm. The average particle diameters of silicon carbide and metal silicon are values measured by laser diffractometry. The kneading was performed by using a vertical type stirrer.

Next, the electrode member forming raw material was applied to a side surface of the dried honeycomb formed body in the form of a band to extend along the honeycomb formed body between both end faces thereof so that a thickness was 1.5 mm and "an angle of 0.5 time a central angle in a cross section perpendicular to a cell extending direction was 50°". The electrode member forming raw material was applied to two portions of the side surface of the dried honeycomb formed body. Then, in the cross section perpendicular to the cell extending direction, one (one portion) of the two portions to which the electrode member forming raw material was applied was disposed on a side opposite to the other portion (another portion) via a center of the honeycomb formed body.

Next, the electrode member forming raw material applied to the honeycomb formed body was dried to obtain a honeycomb dried body with an electrode member raw material. As drying conditions, the drying was performed at 70° C.

Next, four slits were formed in the honeycomb dried body with the electrode member raw material. The slits were formed by using Leutor. It is to be noted that the slits may be formed after the honeycomb dried body with the electrode member raw material is fired. For example, the honeycomb dried body with the electrode member raw material may be degreased and fired to obtain a honeycomb fired body with the electrode member raw material, and the slits may be formed in the obtained honeycomb fired body with the electrode member raw material. Afterward, the honeycomb fired body with the electrode member raw material in which the slits are formed may be subjected to an oxidation treatment to prepare a honeycomb structure with the slits.

Next, the honeycomb dried body with the electrode member raw material in which the slits were formed was degreased, fired and further subjected to the oxidation treatment to obtain the honeycomb structure with the slits. As degreasing conditions, the degreasing was performed at 550° C. for three hours. As firing conditions, the firing was performed at 1450° C. in an argon atmosphere for two hours. As conditions of the oxidation treatment, the treatment was performed at 1300° C. for one hour. In the obtained honeycomb structure with the slits, two slits in each of two portions of the side surface in which the electrode members were not disposed, i.e., four slits in total were formed. A length of each of the four slits in "the cell extending direction" was the same as a length of a honeycomb structure body in "the cell extending direction". A slit depth was 3 mm. A slit width was 1 mm. A slit angle was 120°. In the cross section perpendicular to the cell extending direction of the honeycomb structure with the slits, each of the four slits was formed toward a center of the cross section.

Next, a raw material for a charging material was prepared. First, a neck material constituted of silica, aggregates constituted of silicon carbide and aggregates constituted of cordierite were mixed. Hereinafter, the aggregates constituted of silicon carbide will be referred to as "the SiC aggregates" sometimes. The aggregates constituted of cordierite will be referred to as "the Cd aggregates" sometimes. The neck material, the SiC aggregates and the Cd aggregates were mixed at a mass ratio of 12:6:82 (the neck material:the SiC aggregates:the Cd aggregates). To this mixture, hydroxypropyl methylcellulose as a binder, glycerin as a moisture retaining agent, a surfactant as a dispersing agent and a pore former were added and water was also added, followed by the mixing. The mixture was kneaded to obtain the raw material for the charging material. A content of the binder was 1.0 part by mass, when a total of the neck material, the SiC aggregates and the Cd aggregates was 100 parts by mass. A content of glycerin was 4.0 parts by mass, when the total of the neck material, the SiC aggregates and the Cd aggregates was 100 parts by mass. A content of the surfactant was 0 part by mass, when the total of the neck material, the SiC aggregates and the Cd aggregates was 100 parts by mass. A content of the water was 34.5 parts by mass, when the total of the neck material, the SiC aggregates and the Cd aggregates was 100 parts by mass. A content of the pore former was 6.7 parts by mass, when the total of the neck material, the SiC aggregates and the Cd aggregates was 100 parts by mass. An average particle diameter of the SiC aggregates used in the raw material for the charging material was 3 µm. An average particle diameter of the Cd aggregates used in the raw material for the charging material was 8 µm. The average particle diameters of the SiC aggregates and the Cd aggregates are values measured by the laser diffractometry. The kneading was performed by using the vertical type stirrer. A viscosity of the raw material for the charging material was 250 P. The viscosity of the raw material for the charging material is a value measured by a B-type viscometer.

Next, the obtained raw material for the charging material was charged into the slits of the honeycomb structure with the slits to obtain the honeycomb structure in which the raw material for the charging material was charged. When the raw material for the charging material was charged, the raw material for the charging material was introduced into a syringe and charged (injected) into the slits by use of this syringe. The raw material for the charging material was charged into all the four slits. A charging amount of the raw material for the charging material was equivalent to a slit capacity.

Next, the obtained honeycomb structure in which the raw material for the charging material was charged was subjected to a heat treatment at a temperature of 1225° C. The heat treatment was performed in the air atmosphere. A time of the heat treatment was one hour. As described above, the honeycomb structure of Example 1 was manufactured.

An average pore diameter (pore diameters) of partition walls of the obtained honeycomb structure was 8.6 pm and a porosity thereof was 45%. The average pore diameter and the porosity are values measured by a mercury porosimeter. Furthermore, a thickness of the partition walls of the honeycomb structure was 90 µm and a cell density was 90 cells/cm$^2$. Additionally, a bottom surface of the honeycomb structure had a circular shape having a diameter (an outer diameter) of 93 mm, and a length of the honeycomb structure in a cell extending direction was 100 mm. A thermal expansion coefficient $\alpha 1$ of the honeycomb structure body constituting the honeycomb structure was $4.5 \times 10^{-6}$. A thickness of each of two electrode members was 1.5 mm. In addition, an electrical resistivity of the electrode member was 1.3 Ωcm and an electrical resistivity of the honeycomb structure body was 100 Ωcm. Furthermore, a cell shape in the cross section of the honeycomb structure which was perpendicular to the cell extending direction was hexagonal.

The charging material charged into the slits had a strength of 1200 kPa or more and Young's modulus of 540 MPa or less. The strength of the charging material is a value measured by four-point bending of a sample of the honeycomb structure having the charging material at the center thereof and having a thickness:width ratio of 1:2. The Young's modulus of the charging material is a value obtained by measuring a stress and a strain when a stress of 20 to 50% of that of the four-point bending strength measurement is loaded.

A porosity of the charging material was 60%. The porosity is a value measured by the mercury porosimeter. A thermal expansion coefficient $\alpha 2$ of the charging material was $4.6 \times 10^{-6}$. Therefore, in the honeycomb structure of Example 1, a ratio ($\alpha 2/\alpha 1$) of the thermal expansion coefficient $\alpha 2$ of the charging material to the thermal expansion coefficient $\alpha 1$ of the honeycomb structure body was 1.022.

A column of "the thermal expansion coefficient ratio ($\alpha 2/\alpha 1$)" of Table 1 shows the ratio ($\alpha 2/\alpha 1$) of the thermal expansion coefficient $\alpha 2$ of the charging material to the thermal expansion coefficient $\alpha 1$ of the honeycomb structure body in the honeycomb structure of Example 1. Table 1 shows "the strength (kPa)", "the Young's modulus (MPa)" and "the porosity (%)" of the charging material. Table 1 shows "the thermal expansion coefficient $\alpha 2$ of the charging material" and "the thermal expansion coefficient $\alpha 1$ of the honeycomb structure body".

Furthermore, Table 2 shows a constitution of the charging material. A column of "a neck material" in Table 2 shows the ratio (parts by mass) of the mass of the neck material, when the total of the aggregates and the neck material contained in the charging material is 100 parts by mass. Here, "the SiC aggregates", "the Cd aggregates" and "the SiO$_2$ aggregates" used as the aggregates in Examples 1 to 37 and Comparative Examples 1 to 10 are generically referred to as "the aggregates". In Examples 1 to 37 and Comparative Examples 1 to 10, "the SiO$_2$ aggregates" were not used as the aggregates sometimes. A column of "SiC aggregates" in Table 2 shows the ratio (parts by mass) of the mass of the SiC aggregates, when the total of the aggregates and the neck material contained in the charging material is 100 parts by mass. A column of "the Cd aggregates" in Table 2 shows the ratio (parts by mass) of the mass of the Cd aggregates, when the total of the aggregates and the neck material contained in the charging material is 100 parts by mass. A column of "the SiO$_2$ aggregates" in Table 2 shows the ratio (parts by mass) of the mass of the SiO$_2$ aggregates, when the total of the aggregates and the neck material contained in the charging material is 100 parts by mass. Columns of "an average particle diameter of the SiC aggregates", "an average particle diameter of the Cd aggregates" and "an average particle diameter of the SiO$_2$ aggregates" in Table 2 show the average particle diameters of the abovementioned "SiC aggregates", "Cd aggregates" and "SiO$_2$ aggregates", respectively. A column of "a pore former amount" in Table 2 shows the amount of the pore former included in the raw material for the charging material to prepare the charging material, and shows the ratio (parts by mass) of the mass of the pore former, when the total of the aggregates and the neck material is 100 parts by mass. In addition, for each of the honeycomb structures manufactured in the respective examples and comparative examples, the mass ratio of each component constituting the charging material was obtained by observing a cross section of the charging material by an SEM and analyzing an image of the cross section by image processing software. It was confirmed from this result that the mass ratio of each component constituting the charging material in a manufacturing stage had a value equivalent to that of each component constituting the charging material in the manufactured honeycomb structure. As the image processing software, Win ROOF (trade name) (manufactured by MITANI Corporation) was used. A calculating method of the mass ratio is as follows. First, a sample to observe "a cross section" was cut out from the charging material. Concave and convex portions of the cross section of this sample were filled with a resin, polishing was further performed, and the polished surface was observed by the SEM. Then, an area ratio of each component in the charging material was obtained from the observation results of five view fields of "the cross section" (a magnification of 100 times). Furthermore, the obtained area ratio was regarded as a volume ratio of each component in the charging material, and the above volume ratio was subjected to mass conversion in consideration of specific gravities of the aggregates and the neck material, to obtain "the mass ratio of each component constituting the charging material". In addition, for each of the honeycomb structures manufactured in the respective examples and comparative examples, the average particle diameter of the aggregates contained in the charging material was obtained by observing the cross section of the charging material by the SEM and analyzing the image of the cross section by the image processing software (Win ROOF (trade name) (manufactured by MITANI Corporation)). It was confirmed from this result that the average particle diameter of the aggregates in the manufacturing stage had a value equivalent to that of the average particle diameter of the aggregates in the charging material of the manufactured honeycomb structure.

As to the obtained honeycomb structure, "a thermal shock resistance test" was carried out by a method described in the following. Table 3 shows "a generation temperature of vertical cracks" and "a generation temperature of end face cracks" as the results of "the thermal shock resistance test".

[Thermal Shock Resistance Test (Burner Test)]

A heating/cooling test of the honeycomb structure was carried out by using "a propane gas burner test machine including a metal case to store the honeycomb structure, and a propane gas burner capable of supplying a heating gas into the metal case". The above heating gas was a burning gas generated by burning a propane gas with the gas burner (the propane gas burner). Then, it was confirmed by the above heating/cooling test whether or not any cracks were generated in the honeycomb structure, to evaluate the thermal shock resistance. Specifically, first, the obtained honeycomb structure was stored in the metal case of the propane gas burner test machine (canning). Next, the gas heated by the propane gas burner (the burning gas) was supplied into the metal case, and was allowed to pass through the honeycomb structure. Temperature conditions (inlet gas temperature conditions) of the heating gas allowed to flow into the metal case were set as follows.

First, a temperature was raised up to a specified temperature in five minutes and the specified temperature was held for ten minutes. Afterward, the gas was cooled down to 100° C. in five minutes and held at 100° C. for ten minutes. A series of operations such as the temperature raising, cooling and holding are referred to as "the temperature raising and cooling operations". Afterward, the cracks of the honeycomb structure were confirmed. Next, the above "temperature raising and cooling operations" were repeated while raising the specified temperature from 825° C. every 25° C. The specified temperature was set to 14 stages from 825° C. every 25° C. Specifically, the above "temperature raising and cooling operations" were performed until the specified temperature was raised up to 1150° C. When the specified temperature heightens, a temperature raising steepness enlarges, and a temperature rise of a circumferential portion delays behind a central portion. Therefore, a difference in temperature between the central portion and the circumferential portion enlarges, and a generated stress enlarges. The honeycomb structure in which any cracks are not generated until the specified temperature exceeds 900° C. passes the thermal shock resistance test. That is, when any cracks are not generated at the specified temperature of 900° C., the honeycomb structure passes even in a case where the cracks are generated at a further higher specified temperature, and fails in a case where the cracks are generated at the specified temperature of 900° C. or less. In the present thermal shock resistance test, the presence/absence of the generation of two types of cracks in the following were confirmed. The first type of cracks are called "vertical cracks" and the second type of cracks are called "end face cracks". "The vertical cracks" are cracks generated in the side surface of the honeycomb structure from the first end face toward the second end face of the honeycomb structure. "The end face cracks" are cracks generated in the end faces of the honeycomb structure. A column of "a generation temperature of the vertical cracks" in Table 3 shows a temperature at which the generation of the above vertical cracks is confirmed. A column of "a generation temperature of the end face cracks" in Table 3 shows a temperature at which the generation of the above end face cracks is confirmed.

TABLE 1

| | Thermal expansion coefficient ratio ($\alpha 2/\alpha 1$) | Charging material | | | Thermal expansion coefficient $\alpha 2$ of charging material $\times 10^{-6}$ | Thermal expansion coefficient $\alpha 1$ of honeycomb structure body $\times 10^{-6}$ |
|---|---|---|---|---|---|---|
| | | Strength kPa | Young's modulus MPa | Porosity % | | |
| Example 1 | 1.022 | 1200 | 540 | 60 | 4.6 | 4.5 |
| Example 2 | 0.733 | 400 | 180 | 65 | 3.3 | 4.5 |
| Example 3 | 0.911 | 550 | 230 | 65 | 4.1 | 4.5 |
| Example 4 | 1.267 | 1300 | 610 | 60 | 5.7 | 4.5 |
| Example 5 | 1.489 | 950 | 490 | 60 | 6.7 | 4.5 |
| Comparative Example 1 | 1.556 | 900 | 430 | 60 | 7.0 | 4.5 |
| Example 6 | 1.244 | 1300 | 620 | 60 | 5.6 | 4.5 |
| Example 7 | 1.467 | 1500 | 780 | 60 | 6.6 | 4.5 |
| Comparative Example 2 | 1.533 | 1600 | 780 | 60 | 6.9 | 4.5 |
| Example 8 | 1.311 | 1350 | 610 | 60 | 5.9 | 4.5 |
| Example 9 | 1.289 | 1350 | 690 | 60 | 5.8 | 4.5 |
| Example 10 | 0.889 | 1100 | 520 | 60 | 4.0 | 4.5 |
| Example 11 | 0.778 | 950 | 420 | 60 | 3.5 | 4.5 |
| Comparative Example 3 | It was not possible to charge the charging material. | | | | | |
| Comparative Example 4 | 1.511 | 1500 | 800 | 60 | 6.8 | 4.5 |
| Example 12 | 1.244 | 1100 | 520 | 60 | 5.6 | 4.5 |
| Example 13 | 1.133 | 850 | 410 | 65 | 5.1 | 4.5 |
| Example 14 | 1.022 | 800 | 360 | 65 | 4.6 | 4.5 |
| Example 15 | 0.867 | 1100 | 520 | 60 | 3.9 | 4.5 |
| Example 16 | 1.267 | 1350 | 690 | 60 | 5.7 | 4.5 |
| Example 17 | 1.444 | 1100 | 500 | 60 | 6.5 | 4.5 |
| Example 18 | 1.022 | 1400 | 730 | 60 | 4.6 | 4.5 |
| Example 19 | 0.978 | 1000 | 470 | 60 | 4.4 | 4.5 |

TABLE 1-continued

| | Thermal expansion coefficient ratio (α2/α1) | Charging material Strength kPa | Charging material Young's modulus MPa | Charging material Porosity % | Thermal expansion coefficient α2 of charging material ×10⁻⁶ | Thermal expansion coefficient α1 of honeycomb structure body ×10⁻⁶ |
|---|---|---|---|---|---|---|
| Example 20 | 0.978 | 800 | 400 | 60 | 4.4 | 4.5 |
| Comparative Example 5 | It was not possible to charge the charging material. | | | | | |

TABLE 2

| | Charging material | | | | | | | | |
|---|---|---|---|---|---|---|---|---|---|
| | Neck material Parts by mass | SiC aggregates Parts by mass | Ave. particle dia. of SiC aggregates μm | Cd aggregates Parts by mass | Ave. particle dia. of Cd aggregates μm | SiO₂ aggregates Parts by mass | Ave. particle dia. of SiO₂ aggregates μm | Heat treatment temp. °C. | Pore former amount Parts by mass |
| Ex. 1 | 12 | 6 | 3 | 82 | 8 | 0 | — | 1225 | 6.7 |
| Ex. 2 | 1 | 6 | 3 | 93 | 8 | 0 | — | 1225 | 6.7 |
| Ex. 3 | 6 | 6 | 3 | 88 | 8 | 0 | — | 1225 | 6.7 |
| Ex. 4 | 33 | 6 | 3 | 61 | 8 | 0 | — | 1225 | 6.7 |
| Ex. 5 | 86 | 6 | 3 | 8 | 8 | 0 | — | 1225 | 6.7 |
| Com. Ex. 1 | 92 | 6 | 3 | 2 | 8 | 0 | — | 1225 | 6.7 |
| Ex. 6 | 12 | 70 | 3 | 18 | 8 | 0 | — | 1225 | 6.7 |
| Ex. 7 | 12 | 88 | 3 | 0 | — | 0 | — | 1225 | 6.7 |
| Com. Ex. 2 | 8 | 92 | 3 | 0 | — | 0 | — | 1225 | 6.7 |
| Ex. 8 | 10 | 78 | 3 | 12 | 8 | 0 | — | 1225 | 6.7 |
| Ex. 9 | 12 | 6 | 1 | 82 | 8 | 0 | — | 1225 | 6.7 |
| Ex. 10 | 12 | 6 | 40 | 82 | 8 | 0 | — | 1225 | 6.7 |
| Ex. 11 | 12 | 6 | 55 | 82 | 8 | 0 | — | 1225 | 6.7 |
| Com. Ex. 3 | 12 | 6 | 350 | 82 | 8 | 0 | — | 1225 | 6.7 |
| Com. Ex. 4 | 12 | 72 | 1 | 16 | 8 | 0 | — | 1225 | 6.7 |
| Ex. 12 | 12 | 72 | 10 | 16 | 8 | 0 | — | 1225 | 6.7 |
| Ex. 13 | 12 | 72 | 30 | 16 | 8 | 0 | — | 1225 | 6.7 |
| Ex. 14 | 12 | 72 | 55 | 16 | 8 | 0 | — | 1225 | 6.7 |
| Ex. 15 | 12 | 0 | — | 88 | 8 | 0 | — | 1225 | 6.7 |
| Ex. 16 | 12 | 43 | 3 | 45 | 8 | 0 | — | 1225 | 6.7 |
| Ex. 17 | 13 | 87 | 10 | 0 | — | 0 | — | 1225 | 2.0 |
| Ex. 18 | 12 | 0 | — | 88 | 2 | 0 | — | 1225 | 6.7 |
| Ex. 19 | 12 | 0 | — | 88 | 20 | 0 | — | 1225 | 6.7 |
| Ex. 20 | 12 | 0 | — | 88 | 50 | 0 | — | 1225 | 6.7 |
| Com. Ex. 5 | 12 | 0 | — | 88 | 330 | 0 | — | 1225 | 6.7 |

TABLE 3

| | Thermal shock resistance test | |
|---|---|---|
| | Generation temp. of vertical cracks °C. | Generation temp. of end face cracks °C. |
| Example 1 | 1100 | 1100 |
| Example 2 | 900 | 925 |
| Example 3 | 1025 | 950 |
| Example 4 | 1075 | 925 |
| Example 5 | 1100 | 900 |
| Comparative Example 1 | 1100 | 825 |
| Example 6 | 1050 | 1000 |
| Example 7 | 1000 | 900 |
| Comparative Example 2 | 1000 | 825 |
| Example 8 | 1100 | 925 |
| Example 9 | 1050 | 925 |
| Example 10 | 1000 | 1100 |
| Example 11 | 900 | 1050 |
| Comparative Example 3 | — | — |
| Comparative Example 4 | 1000 | 850 |
| Example 12 | 1100 | 1000 |
| Example 13 | 1000 | 1000 |
| Example 14 | 1100 | 975 |
| Example 15 | 1000 | 1075 |
| Example 16 | 1050 | 1000 |
| Example 17 | 1100 | 900 |
| Example 18 | 1050 | 1100 |
| Example 19 | 1025 | 1050 |
| Example 20 | 1025 | 975 |
| Comparative Example 5 | — | — |

Examples 2 to 37 and Comparative Examples 1 to 10

The procedures of Example 1 were repeated to prepare honeycomb structures, except that respective conditions were changed as shown in Table 1, Table 2, Table 4 and Table 5. "A thermal shock resistance test" was carried out in the same manner as in Example 1. Table 3 and Table 6 show "a generation temperature of vertical cracks" and "a generation temperature of end face cracks" as the results of "the thermal shock resistance test". In each of Comparative Example 3 and Comparative Example 5, a viscosity of a raw material for a charging material was so high that it was not possible to charge the raw material for the charging material into slits, and hence it was not possible to manufacture the honeycomb structure. Therefore, in each of Comparative Example 3 and Comparative Example 5, it was not possible to carry out "the thermal shock resistance test". For Comparative Example 3 and Comparative Example 5, Table 1 shows that "it was not possible to charge the raw material for the charging material".

TABLE 4

|  | Thermal expansion coefficient ratio ($\alpha2/\alpha1$) | Charging material | | | Thermal expansion coefficient $\alpha2$ of charging material $\times 10^{-6}$ | Thermal expansion coefficient $\alpha1$ of honeycomb structure body $\times 10^{-6}$ |
|---|---|---|---|---|---|---|
|  |  | Strength kPa | Young's modulus MPa | Porosity % |  |  |
| Example 21 | 1.244 | 1500 | 720 | 50 | 5.6 | 4.5 |
| Example 22 | 1.311 | 1550 | 780 | 50 | 5.9 | 4.5 |
| Example 23 | 1.444 | 1600 | 830 | 50 | 6.5 | 4.5 |
| Comparative Example 6 | 1.533 | 1650 | 870 | 50 | 6.9 | 4.5 |
| Example 24 | 1.156 | 1100 | 500 | 60 | 5.2 | 4.5 |
| Example 25 | 1.244 | 1150 | 530 | 60 | 5.6 | 4.5 |
| Example 26 | 1.311 | 1300 | 610 | 60 | 5.9 | 4.5 |
| Example 27 | 1.267 | 1250 | 650 | 60 | 5.7 | 4.5 |
| Example 28 | 1.133 | 1000 | 480 | 60 | 5.1 | 4.5 |
| Example 29 | 1.067 | 800 | 420 | 60 | 4.8 | 4.5 |
| Comparative Example 7 | 0.578 | 460 | 210 | 60 | 2.6 | 4.5 |
| Example 30 | 0.844 | 850 | 410 | 60 | 3.8 | 4.5 |
| Comparative Example 8 | 1.511 | 2350 | 1100 | 60 | 6.8 | 4.5 |
| Example 31 | 1.044 | 3300 | 1600 | 15 | 4.7 | 4.5 |
| Example 32 | 1.044 | 2400 | 1100 | 25 | 4.7 | 4.5 |
| Example 33 | 1.044 | 2250 | 1050 | 40 | 4.7 | 4.5 |
| Example 34 | 1.022 | 1750 | 850 | 50 | 4.6 | 4.5 |
| Example 35 | 1.022 | 850 | 400 | 70 | 4.6 | 4.5 |
| Example 36 | 1.000 | 550 | 210 | 80 | 4.5 | 4.5 |
| Example 37 | 0.978 | 300 | 140 | 92 | 4.4 | 4.5 |
| Comparative Example 9 | 0.533 | 820 | 400 | 65 | 2.4 | 4.5 |
| Comparative Example 10 | 0.556 | 950 | 460 | 60 | 2.5 | 4.5 |

TABLE 5

| | Charging material | | | | | | | | |
|---|---|---|---|---|---|---|---|---|---|
|  | Neck material Parts by mass | SiC aggregates Parts by mass | Ave. particle dia. of SiC aggregates μm | Cd aggregates Parts by mass | Ave. particle dia. of Cd aggregates μm | $SiO_2$ aggregates Parts by mass | Ave. particle dia. of $SiO_2$ aggregates μm | Heat treatment temp. °C. | Pore former amount Parts by mass |
| Example 21 | 13 | 68 | 10 | 0 | — | 19 | 3 | 1225 | 2.0 |
| Example 22 | 13 | 57 | 10 | 0 | — | 30 | 3 | 1225 | 2.0 |
| Example 23 | 13 | 32 | 10 | 0 | — | 55 | 3 | 1225 | 2.0 |
| Comparative Example 6 | 13 | 2 | 10 | 0 | — | 85 | 3 | 1225 | 2.0 |
| Example 24 | 12 | 6 | 3 | 79 | 8 | 13 | 3 | 1225 | 6.7 |
| Example 25 | 12 | 6 | 3 | 63 | 8 | 25 | 3 | 1225 | 6.7 |
| Example 26 | 12 | 6 | 3 | 58 | 8 | 30 | 3 | 1225 | 6.7 |
| Example 27 | 12 | 6 | 3 | 63 | 8 | 25 | 1 | 1225 | 6.7 |
| Example 28 | 12 | 6 | 3 | 63 | 8 | 25 | 40 | 1225 | 6.7 |
| Example 29 | 12 | 6 | 3 | 63 | 8 | 25 | 75 | 1225 | 6.7 |
| Comparative Example 7 | 12 | 6 | 3 | 82 | 8 | 0 | — | 250 | 6.7 |
| Example 30 | 12 | 6 | 3 | 82 | 8 | 0 | — | 600 | 6.7 |
| Comparative Example 8 | 12 | 6 | 3 | 82 | 8 | 0 | — | 1600 | 6.7 |
| Example 31 | 12 | 6 | 3 | 82 | 8 | 0 | — | 1225 | 0.8 |
| Example 32 | 12 | 6 | 3 | 82 | 8 | 0 | — | 1225 | 1.3 |

TABLE 5-continued

| | Charging material | | | | | | | | |
|---|---|---|---|---|---|---|---|---|---|
| | Neck material Parts by mass | SiC aggregates Parts by mass | Ave. particle dia. of SiC aggregates μm | Cd aggregates Parts by mass | Ave. particle dia. of Cd aggregates μm | $SiO_2$ aggregates Parts by mass | Ave. particle dia. of $SiO_2$ aggregates μm | Heat treatment temp. ° C. | Pore former amount Parts by mass |
| Example 33 | 12 | 6 | 3 | 82 | 8 | 0 | — | 1225 | 3.2 |
| Example 34 | 12 | 6 | 3 | 82 | 8 | 0 | — | 1225 | 4.0 |
| Example 35 | 12 | 6 | 3 | 82 | 8 | 0 | — | 1225 | 9.0 |
| Example 36 | 12 | 6 | 3 | 82 | 8 | 0 | — | 1225 | 14.0 |
| Example 37 | 12 | 6 | 3 | 82 | 8 | 0 | — | 1225 | 32.0 |
| Comparative Example 9 | 6 | 0 | — | 94 | 20 | 0 | — | 600 | 6.7 |
| Comparative Example 10 | 6 | 0 | — | 94 | 20 | 0 | — | 600 | 4.0 |

TABLE 6

| | Thermal shock resistance test | |
|---|---|---|
| | Generation temp. of vertical cracks ° C. | Generation temp. of end face cracks ° C. |
| Example 21 | 1050 | 1000 |
| Example 22 | 1000 | 925 |
| Example 23 | 1000 | 900 |
| Comparative Example 6 | 1000 | 825 |
| Example 24 | 1100 | 1025 |
| Example 25 | 1100 | 1000 |
| Example 26 | 1075 | 925 |
| Example 27 | 1050 | 925 |
| Example 28 | 1100 | 1050 |
| Example 29 | 1100 | 975 |
| Comparative Example 7 | 825 | 925 |
| Example 30 | 1000 | 1000 |
| Comparative Example 8 | 950 | 850 |
| Example 31 | 925 | 1100 |
| Example 32 | 950 | 1100 |
| Example 33 | 950 | 1100 |
| Example 34 | 1000 | 1100 |
| Example 35 | 1100 | 1000 |
| Example 36 | 1050 | 950 |
| Example 37 | 1025 | 925 |
| Comparative Example 9 | 850 | 1000 |
| Comparative Example 10 | 825 | 1050 |

(Conclusion)

As shown in Table 3 and Table 6, in the honeycomb structures of Examples 1 to 37, both "a generation temperature of vertical cracks" and "a generation temperature of end face cracks" were 900° C. or more, so that the honeycomb structures were excellent in thermal shock resistance. On the other hand, in the honeycomb structures of Comparative Examples 1, 2, 4 and 6 to 10, at least one of "a generation temperature of vertical cracks" and "a generation temperature of end face cracks" was lower than 900° C., so that the honeycomb structures had problems in thermal shock resistance. In Comparative Example 3 and Comparative Example 5, a viscosity of a raw material for a charging material was so high that it was not possible to charge the raw material for the charging material into slits, and hence it was not possible to manufacture honeycomb structures. It has been found from the abovementioned results that when a ratio ($α2/α1$) of a thermal expansion coefficient $α2$ of the charging material to a thermal expansion coefficient $α1$ of a honeycomb structure body is from 0.6 to 1.5, the generation of the cracks at high temperatures can be inhibited.

INDUSTRIAL APPLICABILITY

A honeycomb structure of the present invention can suitably be utilized as a catalyst carrier for an exhaust gas purifying device to purify an exhaust gas of a car.

DESCRIPTION OF REFERENCE SYMBOLS

1: partition wall, 2: cell, 3: circumferential wall, 4: honeycomb structure body, 5: side surface, 6: slit, 6a: shortest-distance slit, 7: charging material, 11: first end face (end face), 12: second end face (end face), 21: electrode member, 82: bend testing sample, 83: inner fulcrum, 84: outer fulcrum, 85: length, 86: width, 87: thickness, 88: width of the charging material, 89: honeycomb structure body, 100, 120, 130, 140, 150, 160, 170, 180, 190 and 200: honeycomb structure, O: center, C: central portion (of the electrode member), L: center line, L1 and L2: line segment, α: central angle, β: angle, θ: angle of 0.5 time the central angle, A and B: region, D: distance, P: point (end point), SA: slit angle, and HL: half line.

What is claimed is:
1. A honeycomb structure comprising:
a pillar honeycomb structure body having porous partition walls defining a plurality of cells which become through channels for a fluid and extend from a first end face to a second end face, and a circumferential wall positioned at an outermost circumference; and
a pair of electrode members disposed on a side surface of the honeycomb structure body,
wherein the honeycomb structure body heats by energization,
each of the pair of electrode members is shaped in the form of a band extending in an extending direction of the cells of the honeycomb structure body,
in a cross section perpendicular to the extending direction of the cells, one electrode member in the pair of electrode members is disposed on a side opposite to the other electrode member in the pair of electrode members via a center of the honeycomb structure body,
one or more slits opened in the side surface are formed in the honeycomb structure body,
the honeycomb structure body has a charging material charged into the at least one slit, the charging material is disposed in at least a part of a space of the slit, the charging material contains aggregates and a neck material, and a ratio ($\alpha 2/\alpha 1$) of a thermal expansion coefficient $\alpha 2$ of the charging material at 25 to 800° C. to a thermal expansion coefficient $\alpha 1$ of the honeycomb structure body at 25 to 800° C. is from 0.6 to 1.5.

2. The honeycomb structure according to claim 1, wherein a strength of the charging material is 500 kPa or more and Young's modulus of the charging material is 1500 MPa or less.

3. The honeycomb structure according to claim 1, wherein a porosity of the charging material is from 20 to 90%.

4. The honeycomb structure according to claim 2, wherein a porosity of the charging material is from 20 to 90%.

5. The honeycomb structure according to claim 1, wherein the charging material contains 2 to 90 mass % of the neck material.

6. The honeycomb structure according to claim 2, wherein the charging material contains 2 to 90 mass % of the neck material.

7. The honeycomb structure according to claim 3, wherein the charging material contains 2 to 90 mass % of the neck material.

8. The honeycomb structure according to claim 4, wherein the charging material contains 2 to 90 mass % of the neck material.

9. The honeycomb structure according to claim 1, wherein the charging material contains the aggregates including silicon carbide and a content of the aggregates including silicon carbide in the charging material is 90 mass % or less.

10. The honeycomb structure according to claim 9, wherein an average particle diameter of the aggregates including silicon carbide is 300 μm or less.

11. The honeycomb structure according to claim 1, wherein the charging material contains the aggregates including cordierite.

12. The honeycomb structure according to claim 11, wherein an average particle diameter of the aggregates including cordierite is 300 μm or less.

13. The honeycomb structure according to claim 1, wherein the charging material contains the aggregates including silicon oxide and a content of the aggregates including silicon oxide in the charging material is 80 mass % or less.

14. The honeycomb structure according to claim 13, wherein an average particle diameter of the aggregates including silicon oxide is 300 μm or less.

15. The honeycomb structure according to claim 1, wherein an electrical resistivity of the honeycomb structure body is from 1 to 200 Ωcm.

* * * * *